United States Patent
Fukushima et al.

(10) Patent No.: US 9,529,330 B2
(45) Date of Patent: Dec. 27, 2016

(54) WRIST WATCH OSCILLATING STEP MOTOR WITH SWEEP MOTION

(75) Inventors: Toshiaki Fukushima, Tokorozawa (JP); Akira Shiota, Saitama (JP); Toshinari Maeda, Tokorozawa (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 814 days.

(21) Appl. No.: 13/821,341

(22) PCT Filed: Sep. 1, 2011

(86) PCT No.: PCT/JP2011/069875
§ 371 (c)(1),
(2), (4) Date: Mar. 7, 2013

(87) PCT Pub. No.: WO2012/032993
PCT Pub. Date: Mar. 15, 2012

(65) Prior Publication Data
US 2013/0162060 A1 Jun. 27, 2013

(30) Foreign Application Priority Data
Sep. 9, 2010 (JP) ................................. 2010-201783

(51) Int. Cl.
*H02K 7/116* (2006.01)
*G04C 3/14* (2006.01)

(52) U.S. Cl.
CPC ................. *G04C 3/14* (2013.01); *G04C 3/143* (2013.01); *H02K 7/116* (2013.01)

(58) Field of Classification Search
CPC ..................................................... H02K 7/116
(Continued)

(56) References Cited

U.S. PATENT DOCUMENTS 2,741,083 A * 4/1956 Sullivan ................. G04C 3/063
310/37
3,541,778 A * 11/1970 Ingenito .................... G04C 3/10
310/46
(Continued)

FOREIGN PATENT DOCUMENTS

JP 39-10891 6/1939
JP 52-123665 10/1977
(Continued)

OTHER PUBLICATIONS

Chinese Office Action issued Mar. 5, 2014 in corresponding Chinese Patent Application No. 201180043729.1.
(Continued)

*Primary Examiner* — Naishadh Desai
(74) *Attorney, Agent, or Firm* — Wenderoth, Lind & Ponack, L.L.P.

(57) ABSTRACT

An oscillating stepping motor can reduce a required rotational angle of a rotor to drive a star wheel, reduce idle driving, cut the loss of energy required for the driving, reduce power consumption even in high-frequency driving, and stably operate. Two star wheels are located so that the tooth tips thereof are not engaged with each other. A rotor shaft includes a rotor pinion having two feed teeth at a certain aperture angle. One of the feed teeth feeds one of the driving wheels by oscillation of the rotor in one direction and the other of the feed teeth feeds the other of the driving wheels by the oscillation of the rotor in the other. The rotor then oscillates within a certain angle range, thereby sequentially rotating output gears in a certain direction by a certain angle.

8 Claims, 17 Drawing Sheets

(58) Field of Classification Search
USPC ............. 310/37–39, 49.01–49.55, 49 R
See application file for complete search history.

(56) References Cited

U.S. PATENT DOCUMENTS

| | | | |
|---|---|---|---|
| 3,827,234 A * | 8/1974 | Imanishi | G04B 19/2536 368/38 |
| 3,978,358 A * | 8/1976 | Johnson | G04C 3/16 310/156.12 |
| 4,104,859 A | 8/1978 | Ogihara et al. | |
| 4,270,198 A | 5/1981 | Tamura et al. | |
| 4,321,521 A | 3/1982 | Ueda et al. | |
| 4,910,721 A * | 3/1990 | Hayakawa | G04C 9/00 368/149 |
| 2008/0212415 A1* | 9/2008 | Nagao | G04C 3/12 368/204 |

FOREIGN PATENT DOCUMENTS

| | | |
|---|---|---|
| JP | 53-86269 | 7/1978 |
| JP | 55-20461 | 2/1980 |
| JP | 6-258459 | 9/1994 |

OTHER PUBLICATIONS

International Search Report (ISR) issued Oct. 4, 2011 in International (PCT) Application No. PCT/JP2011/069875.
Partial English translation of JP 52-123665 (previously submitted).
Partial English translation of JP 39-10891 (previously submitted).

* cited by examiner (a)

(b)

(c)

(a)

(b)

(c)

LONGITUDINAL AXIS: CURRENT (mA)
ABSCISSA AXIS: TIME (mS)

(a)

(b)

(c)

(a)

(b)

(c)

VIEW A

WRIST WATCH OSCILLATING STEP MOTOR WITH SWEEP MOTION

CROSS REFERENCE TO RELATED APPLICATION

The present application is based on and claims priority from Japanese Patent Application No. 2010-201783, filed on Sep. 9, 2010, the disclosure of which is hereby incorporated by reference in its entirety.

TECHNICAL FIELD

The present invention relates to the structure of a stepping motor used for an electric-mechanical converter of an analog electronic timepiece, in particular, to an oscillating stepping motor in which an output gear is driven by a certain angle in each reciprocating movement by the reciprocating movement of a rotor at certain angular amplitude.

BACKGROUND ART

A general bipolar stepping motor used in the analog electronic timepiece is a successful element in terms of low power consumption and reliable operation. It is configured to drive a wheel train connected to a second hand, a minute hand, and an hour hand by the 180-degree rotation of the rotor once in every second.

Such an analog electronic timepiece moves a second hand once in a second. Some users, however, prefer a continuous motion (also called sweep motion; can be an intermittent motion several to 10 several times in second) of a second hand of a mechanical timepiece. In the continuous motion, the second hand appears to fluently move. A demand therefor has been increasing in recent years.

To satisfy such a demand by use of a general stepping motor, the interval of drive timing needs to be shorted to increase a reduction ratio toward the second hand. However, the inertia ratio of the rotor is ineligible and accelerated at every driving of the wheel train. Excessive kinetic energy of the rotor is discarded in the process of the free damped oscillation. Because of this, along with an increase in the driving frequency, a rate of wasted power consumption increases, accelerating the weakening of batteries.

Among the analog electronic timepieces with the continuous second-hand motion, a wrist watch especially faces a large problem in terms of downsizing and thinning since it requires a large size of battery for a sufficient longevity.

Further, it is possible for the wrist watch to incorporate a generator such as solar battery in order to eliminate the need for battery replacement. However, such a non-battery replacing wrist watch cannot be realized since a large amount of power is consumed in continuous second-hand motion with use of a general stepping motor, which cannot be sufficiently supplied by a generator mounted in the wrist watch.

The inventors of the present invention took notice of too sufficient amount of output energy and torque from the axis of the second hand when the reduction ratio is set to a large value for the continuous motion. On the assumption that the power problem at a high-frequency motion could be overcome by reducing input energy, that is, input stroke, they decided not to rotate the rotor in the same direction but to reciprocate the rotor at a certain angle or oscillate it.

They studied related art to reciprocate a motion converter or change the direction of motion to thereby drive the wheel train of a timepiece, as disclosed in Patent Documents 1 and 2 below.

FIG. 16 is a plan view of the structure of an electric timepiece and the essential drive elements disclosed in Patent Document 1.

In FIG. 16 a rotor 163 reciprocates in horizontal direction. It is integrated with a feed tooth 1614a of a drive cam and includes driven wheels 1611, 1612 engaged with each other to drive the driven wheel 1611 counterclockwise by a half tooth by the clockwise rotation of the feed tooth 1614a from the position in the drawing. The other driven wheel 1612 is also rotated by the same amount. Then, the driven wheel 1612 is rotated clockwise by a half tooth by the counterclockwise rotation of the feed tooth 1614a. By reciprocating this motion, a fifth wheel 1613 is rotated in a certain direction by a constant amount.

Further, the document also discloses a reverse stop element 167 to position the teeth of the driven wheels and rotation stop teeth 1614b, 1614c to hit the teeth of the driven wheels to prevent excessive amplitude.

FIG. 17 is a plan view of the structure of a magnetic reverse escapement of an electric timepiece and the essential drive elements thereof disclosed in Patent Document 2.

In FIG. 17 the teeth of the two star wheels 171 has the same polarity at a tip side and opposite polarities on the side of a rotational shaft 172, and two gears 173 are coaxially adhered on the star wheels and engaged with each other. Because of this, the two star wheels 171 become stable in the state in the drawing or in a horizontally inverted state by magnetic attraction and repulsion. Hereinafter, the gears contacting or engaged with a drive source at a selected time are differentiated from the star wheels.

A magnet piece 174 is attached to an oscillation element 176 made of an oscillating permanent magnet, and reciprocates. The end of the magnet piece has the same polarity to that of the tooth tips of the two star wheels so that the star wheels are driven alternatively by magnetic repulsion with the teeth of the star wheels 171.

The related art in Patent Document 2 uses the two star wheels 171 driving together with the two gears 173. Because of this, the two driven wheels do not need to be engaged with a feed tooth unlike in Patent Document 1 shown in FIG. 16, and it is advantageous that the tooth shape of the star wheels 171 can be optimally designed for intrinsic feed operation.

Meanwhile, there is a known technique for oscillating the rotor to separately drive two gears in different directions (disclosed in Patent Document 3, for instance).

FIG. 18 is a plan view of the structure of a drive system of a crystal timepiece and the essential drive elements thereof disclosed in Patent Document 3.

In FIG. 18 a drive claw 1825a is fixed to the rotational shaft of an electromechanical converter which can rotate forward and reversely. The teeth of the second transmitting wheel 1833 are driven by a forward rotation signal which is generated in every second, to feed the second hand by a second-hand wheel 1827 connected with the second transmitting wheel 1833 and integrally moving with the second hand.

Further, it is reversely rotated by a reverse rotation signal which is generated at once in 10 seconds in a gap between second feed pulses, to drive the teeth of a fourth wheel 1834 connected with a minute hand and a hour hand.

That is, the drive claw 1825a has two edges facing the second transmitting wheels 1833 and fourth wheel 1834, in other words, includes two drive claws.

The teeth of the second transmitting wheel 1833 and fourth wheel 1834 are driven by a single tooth only when the drive claw 1825a moves in the normal directions. They are positioned by a positioning magnet 1840 so as to only shake and not to feed if touched while the claw moves in the opposite direction.

Thus, the related art disclosed in Patent Document 3 concerns a gear feeding mechanism by use of oscillation, however, the structure does not comprise the star wheels driving with the driven wheels as that disclosed in Patent Document 2.

PRIOR ART DOCUMENT

Patent Document

Patent Document 1: Japanese Patent Application Publication No. S55-20461 (page 2, FIG. 2)
Patent Document 2: Japanese Examined Patent Application Publication No. S39-10891 (pages 1 to 2, FIG. 7)
Patent Document 3: Japanese Patent Application Publication No. S53-86269 (pages 2 to 3, FIG. 3)

Problems to be Solved by the Invention

The related art in Patent Document 1 faces the following three problems.

First, the moving distance of the feed tooth 1614a from the starting point, for example, facing the middle point of the shafts of both driven wheels, to a contact point with the tooth of the driven wheel to feed, is excessively long, and so is the rotation angle of the rotor 163 necessary to move the feed tooth. Thus, the rotor 163 is moved with no avail, consuming energy wastefully in this process.

In the following the moving distance of the feed tooth from the starting point to the contact point with the tooth of the driven wheel to feed and the rotation angle of the feed tooth (rotor) necessary to move it are referred to as idle distance and idle angle, respectively.

In short, these terms represent the distance that a feed element as the feed tooth of the rotor shaft contacts a rotary element as the gears or star wheels and the rotation angle of the rotor shaft or feed element needed for the moving. The idle distance and idle angle may be collectively referred to as idle driving simply in the following.

Second, to prevent the returning feed tooth from hooking the front teeth of the same driven wheel and feeding it backward, the depth of engagement of the feed tooth and driven wheel's teeth is set to be shallow. This reduces a transmission efficiency of feeding force of the feed tooth to the driven wheel's teeth.

Further, it is known from the gear theory that when the portions close to the tooth tips contact and slide, the orientation of contact force is largely inclined from the tangent line of the gear and a large sliding friction occurs.

Third, the designing freedom of the tooth shape of the driven wheel is restricted since it needs to satisfy smoothness in view of the kinds of engagement with the other driven wheel and with the feed tooth.

The related art in Patent Document 2 uses the star wheels driven with the driven wheel, therefore, the tooth shape of the star wheels 171 can be freely, optimally designed. However, it faces the following two problems.

First, as the first problem with Patent Document 1, the idle driving (idle distance at the tip of the magnet piece 174 or idle angle of the rotary oscillator 176) of the magnet piece 174 to drive the star wheels by oscillation is large.

Second, it is not certain that stability in magnetic positioning of the star wheels and the magnetic force from the magnet piece can be sufficiently acquired. It may be insufficient to properly feed the gears, resulting in consuming energy wastefully.

Thus, the related art in Patent Document 1 using the star wheels can solve the problem with the Patent Document 2 in the engagement of the driven wheel and feed tooth. However, it cannot solve the problems such as a large idle distance of the feed tooth of the feed system or the idle angle of the rotor, transmission of force to the star wheels, and unnecessary energy consumption.

Further, the unnecessary energy consumption for the idle driving of the feed tooth cannot be resolved by the combination of the mechanism including the rotor shaft with two driving claws (feed tooth) in Patent Document 3 and the related art disclosed in Patent Document 2.

DISCLOSURE OF THE INVENTION

The present invention aims to prevent unnecessary energy consumption even with use of an oscillating rotor.

The object of the present invention is to provide an oscillating stepping motor which can stably operate with a reduced energy loss in driving and less power consumption even in high-frequency driving by reducing a required rotation angle of a rotor to rotate star wheels by a certain angle and decreasing the idle distance and idle angle.

Means to Solve the Problems

In view of achieving the above object, the oscillating stepping motor according to the present invention is configured as below.

In the oscillating stepping motor an output gear is rotated by a certain angle in a certain direction by oscillating a rotor in a certain angle range to feed two driving wheels in sequence. The rotor includes two feed teeth, and one of the feed teeth feeds one of the driving wheels by oscillation of the rotor in one direction and the other of the feed teeth feeds the other of the driving wheels by the oscillation of the rotor in the other direction.

As configured above, the two feed teeth drive the respective driving wheels to be able to reduce the idle driving. Further, each of the feed teeth can be placed in advance to be close to the teeth of the driving wheel to feed, further reducing the idle driving.

The driving wheels are comprised of star wheels contacting and driven by the feed teeth in a certain direction and gears coupled with the star wheels to be associated with each other. The two star wheels can be positioned so that tooth tips thereof are not engaged with each other, and the two gears can be positioned so that tooth tips thereof are engaged with each other.

As configured above, the shape of the star wheels can be optimally designed to be reliably fed by the feed teeth. The oscillating stepping motor which operates reliably can be thus realized.

The two feed teeth are provided at a certain aperture angle relative to a rotational shaft of the rotor. The certain aperture angle can be an angle at which when the rotor is free from the drive force and remains at a neutral position only by a retaining force of a stator, one of the feed teeth closely approaches one tooth of one of the two star wheels in a first distance, and the other feed tooth closely approaches one tooth of the other star wheel in a second distance larger than the first distance.

As described above, the condition for reducing the idle driving can be more distinctively defined.

Further, each of the two feed teeth of a rotor pinion can be located outside a triangular area formed by a center of the two star wheels and a center of the rotational shaft of the rotor.

As configured above, a geometric condition for reducing the idle driving can be presented.

Further, when one of the feed teeth and one tooth of one of the star wheels ahead approach each other most at the neutral position, at a next driving, the one of the feed teeth can drive the one of the star wheels, and at completion of the driving, when the rotor returns to the neutral position, the other feed tooth and the other star wheel ahead approach each other most, and at another next driving, the other feed tooth can drive one tooth of the other star wheel.

As configured above, an operational condition for reducing the idle driving can be clearly set.

Further, the rotor includes a permanent magnet with a polarity along a diameter. The drive force can be set to be insufficient to rotate the rotor at 180 degrees.

As configured above, the upper limit of the drive energy of the oscillating stepping motor can be set.

Further, the two gears can be coaxially fixed onto the two star wheels, respectively.

As configured above, the star wheels and gears can be moved together without a complex coupling mechanism. In addition, the two star wheels can be avoided from contacting each other, resulting in securing the operation of the stepping motor.

Further, the two star wheels comprise two pinions coaxially fixed thereon, respectively. The two gears can be connected to the two pinions, respectively and engaged with each other.

As configured above, the moment of inertia ratio and the drive load of the two gears relative to the rotor can be decreased, further reducing energy loss of the stepping motor.

Further, an angular relation of the connected star wheels and gears can be set such that a direction in which shafts and teeth of the star wheels are connected is shifted by a half pitch from a direction in which the shafts of the star wheels and the shaft of the rotor are connected. The star wheels can be driven alternatively by a half pitch by the oscillation.

As configured above, the oscillating stepping motor can perform the feed operation reliably.

Further, the oscillating stepping motor can further comprise a holder to hold the teeth of the star wheels at a certain position when the star wheels are not applied with the electromechanical drive force from the stator.

As configured above, the teeth of the star wheels can be stably positioned even during a non-driving period, the oscillating stepping motor can drive certainly without receiving an influence from disturbance.

Further, the holder can be made of a permanent magnet to directly or indirectly act on the teeth of the star wheels or of the gears.

As configured above, it is made possible to hold the position of the teeth of the star wheels by a magnetic force without a friction.

Further, the holder can be a spring to act on at least one of the star wheels and gears with a friction.

As configured above, the structure of the holder can be simplified.

Further, the oscillating stepping motor can further comprise a small gear to engage with the gear or star wheels to act on the star wheels or the gear via the small gear.

As configured above, the mechanism including the holder can be downsized.

Further, the oscillating stepping motor can further comprise a rotation restricting element to restrict the oscillation angle of the rotor.

As configured above, an excessively large oscillation angle of the rotor can be prevented without a fail.

Further, the rotor can be configured to reciprocate to drive the teeth of the star wheels by the electromechanical drive force from the stator and return to the neutral position by a retaining force from the stator after completion of a drive period.

As configured above, the rotor can be returned to the neutral position without a complex mechanism.

Further, the rotor can be returned to the neutral position, using an induced voltage as an operation determining signal of the oscillating stepping motor, the induced voltage occurring from a coil wrapped around the stator by a motion of the permanent magnet of the rotor.

As configured above, it can be checked whether or not the motor operates normally to feed back a check result to a drive condition. This enables a more advanced operation control over the oscillating stepping motor with a reduced power consumption.

The Effects of the Invention

According to the present invention, the feed teeth driving with the rotor shaft are configured not to directly feed the gears but to drive the star wheels driving with the gears. This makes it possible to reduce a required rotation angle of the rotor to rotate the star wheels by a certain angle and reduce the idle driving, resulting in reducing an energy loss in driving the motor as well as power consumption even at a high frequency driving.

Further, the star wheels can be optimally designed to position the feed teeth and star wheels appropriately, which enables the gears to reliably operate.

EMBODIMENTS OF THE INVENTION

The oscillating stepping motor uses a driving wheel made of star wheels and gears and includes two star wheels positioned to prevent the engagement of their tooth tips, two gears coupled in association with the two star wheels and reversely rotate from each other, an oscillating rotor with feed teeth with a certain aperture angle. The feed teeth contact the star wheels to press them in accordance with a moving direction of the rotor.

The aperture angle of the feed teeth is set to an angle such that when the rotor receives no drive force and is at a neutral position, one of the feed teeth approaches one of the star wheels closely in a first distance and the other of the feed teeth approaches the other star wheel closely in a second distance.

This makes it possible to reduce idle driving and narrowing the rotor operation range (rotation angle) in driving the star wheels and reduce unnecessary energy consumption.

A first embodiment describes an example in which the star wheels and gears as driving wheel are coaxially placed. A second embodiment describes an example where the star wheels and gears are not coaxially placed but on different axes by use of another gear (pinion).

The driving wheel is comprised of the star wheels and gears but the one using an additional gear in the second embodiment is considered as a driving wheel.

Further, the feed teeth of the rotor are not directly provided on the rotor but a rotor pinion with the feed teeth is used.

Hereinafter, the embodiments are described with reference to the accompanying drawings. The same reference numbers will be used throughout the drawings to refer to the same or like parts. For simplicity, the reference numbers may be omitted. A description may be referred to multiple drawings.

The following embodiments describe a timepiece by way of example. However, they omit describing and showing the features irrelevant to the invention, for example, the elements such as bottom plate, bearings, hands, drive circuit boards.

First Embodiment

Description of First Embodiment

FIG. 1 to FIG. 11

The oscillating stepping motor according to a first embodiment of the present invention is described with reference to FIG. 1 to FIG. 11. First, the motor structure is described referring to FIG. 1 to FIG. 4.

Figure 1:
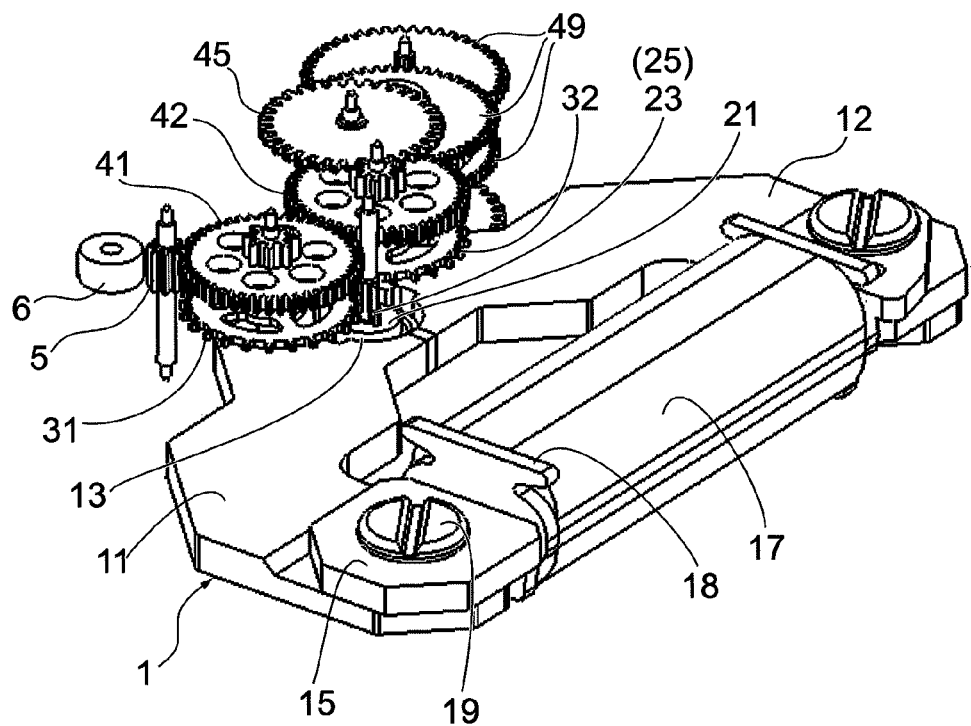
FIG. 1 is a perspective view of the essential part of a first embodiment of the present invention.

FIG. 1 shows the structure of the essential part of the oscillating stepping motor.

In FIG. 1 it includes a stator 1 made of a magnetic plate including a stator A11, a stator B12 coupled with each other at both ends of the diameter of a hole 13 by a non-magnetic element 14, a winding core 15 overlapped at both expanded ends of the stator and fastened on a not-shown bottom plate with a stop screw 19, and a coil 17 and a reel 18 around which a wiring is wrapped, although not shown.

Further, in FIG. 1 it includes a magnet pinion 5, a magnet 6, star wheels A 31, B 32, gears 41, 42, an output gear 45, and a motion wheel train 49.

Figure 2:
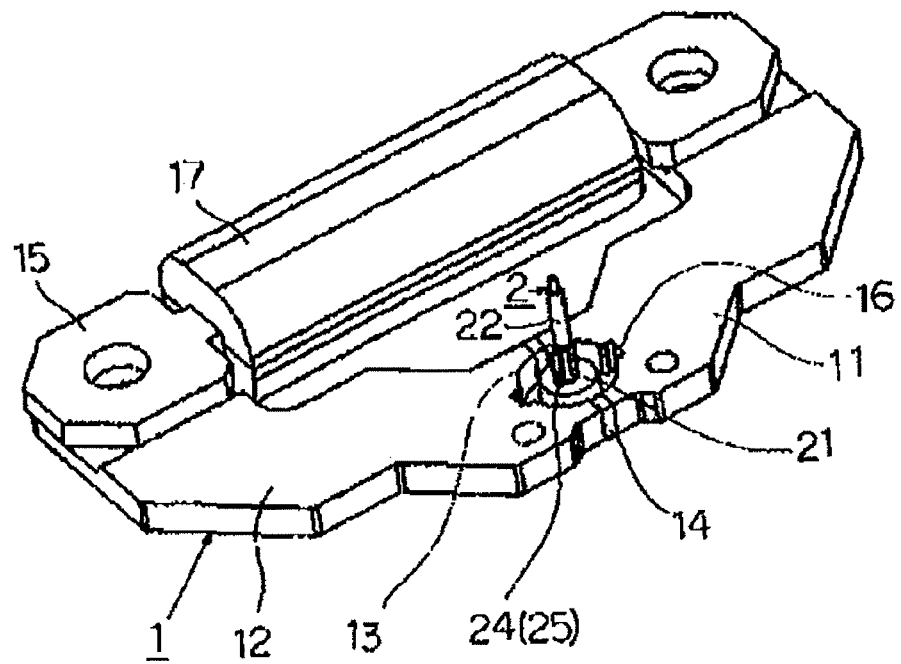
FIG. 2 is a perspective view of a stator and a rotor according to the first embodiment.

FIG. 2 shows a rotor 2, a rotor magnet 21, a rotor shaft 22, a feed tooth A 23, a feed tooth B 24, and a rotor pinion 25.

Figure 4:
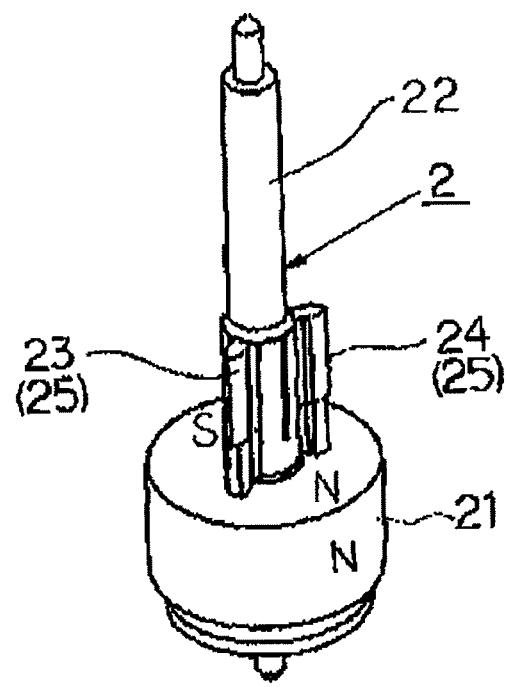
FIG. 4 is a perspective view of the rotor according to the first embodiment.

FIGS. 2 and 4 show the details of the structure of the rotor 2.

The rotor 2 includes the rotor magnet 21, rotor shaft 22 as a rotational shaft, and feed teeth A 23, B 24 integrated with the rotor shaft 22. The rotor magnet 21 is of a cylindrical or ring shape and magnetized along the diameter.

The feed teeth A 23, B 24 are a part of the rotor pinion 25. This is an example of the rotor shaft having the rotor pinion 25 in the present embodiment. Alternatively, the rotor shaft 22 is formed by grounding to include the feed teeth A 23, B 24 integrated with the rotor shaft.

The feed teeth A 23, B 24 are a main component of the rotor pinion 25. The rotor pinion 25 according to the present invention includes only two teeth and is different from a general small gear which can bidirectionally rotate an engaging gear. The rotor pinion 25 is made of the feed teeth A23, B24 and a connecting portion to their tooth bottoms throughout the embodiments and examples.

The feed teeth and tooth bottoms can be integrally or separately formed with the rotor shaft 22. For example, ring-like tooth bottoms can be inserted into the rotor shaft and fixed.

The orientation of the two feed teeth is at a certain aperture angle relative to the axis of the rotor shaft 22 of the rotor 2 as rotational shaft. This is selected from an angular range appropriate for feed operation, for instance, 135 degrees.

The feed teeth A 23, B 24 can be simply formed by cutting off two neighboring teeth from a typical 8-tooth rotor pinion for a general full-rotation stepping motor and cutting off four teeth surrounded by the remaining two teeth.

The aperture angle of the feed teeth A 23, B 24 is described in detail in association with feed operation.

Figure 3:
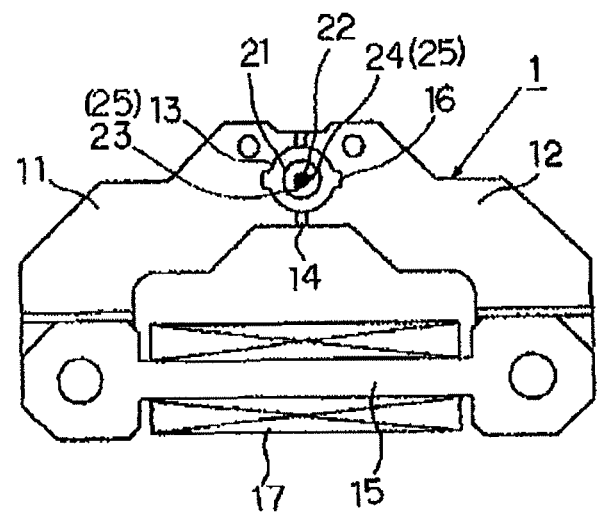
FIG. 3 is a plan view of the stator and rotor according to the first embodiment.

FIG. 3 shows the detailed structure of the stator 1.

In FIG. 3 while the coil 17 is not given a drive current, a magnetic restoring force acts between the rotor magnet 21 and the stator 1 in the hole 13 of the stator 1 by the action of a deformed portion 16 provided in the hole 13 so that the magnetization of the rotor magnet 21 works to the non-magnetic element 14. This direction is referred to as a neutral direction of the rotor magnet 21. The deformed portion 16 is a so-called internal notch.

When the coil 17 is applied with a drive current for a short period, the rotor is rotated in either way in accordance with the polarity of the drive current, and with no current applied, it is returned in the neutral direction by magnetic restoring force. The magnitude of the drive current is set to a value such that the rotation of the rotor 2 does not reach 180 degrees.

Next, when the coil 17 is applied with a drive current with the opposite polarity and same waveform, the rotor 2 is reversely rotated and with no drive current applied, it is returned in the neutral direction. This oscillation is repeated.

Figure 5:
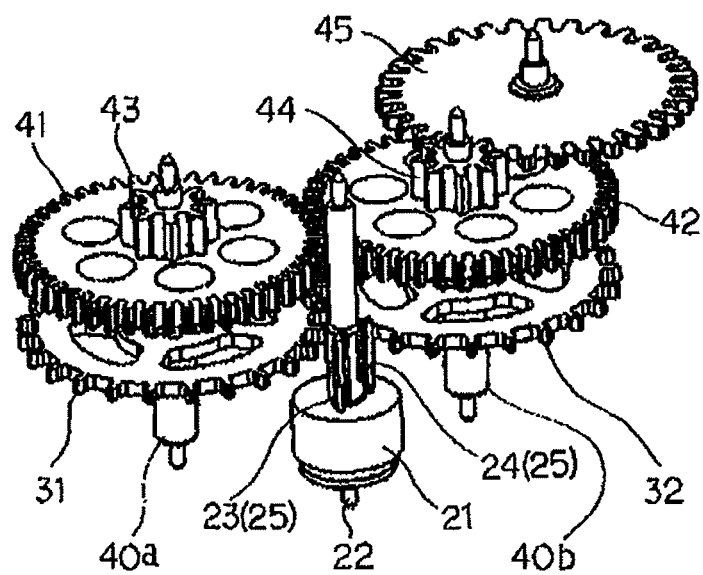
FIG. 5 is a perspective view of the rotor, star wheels, and gears according to the first embodiment.
Figure 6:
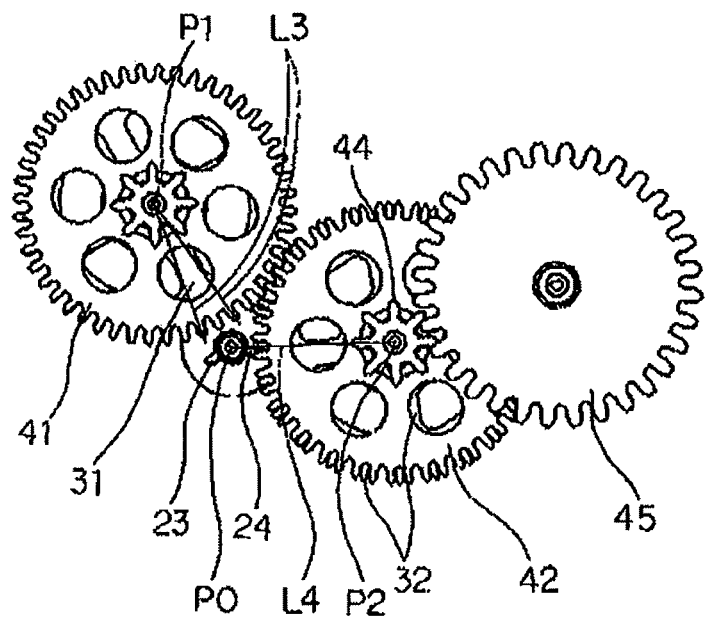
FIG. 6 is a plan view showing a relation between the phases of the star wheels and gears according to the first embodiment.

[Drive Mechanism: FIGS. 1, 5, 6]

Next, a drive mechanism is described with reference to FIGS. 1, 5-6.

FIG. 5 shows gear shafts 40a, 40b and pinions A 43, B 44, and the pinion B 44 is engaged with an output gear 45 to drive the hands.

The star wheel A 31, gear A 41, and pinion A 43 are coaxially provided via the gear shaft 40a. Thereby, the star wheel A 31 and gear A 41 are coupled in association with each other.

Likewise, the star wheel B 32, gear B 42, and pinion B 44 are provided coaxially via the gear shaft 40b. The star wheel B 32 and gear B 42 are coupled in association with each other. The output gear 45 is engaged with the pinion B 44.

The star wheels A 31, B 32 have the same number of teeth and located so that their tooth tips are not engaged. They are alternatively driven by the oscillation of the feed teeth A 23, B 24. The numbers of the teeth of the gears A 41, gear B 42 are the same and they are engaged with each other.

Since the pinion B 44 coaxial with the gear B 42 is engaged with the output gear 45, when one of the star wheels is driven, the other is also rotated in opposite direction by the same amount. That is, the output gear 45 is rotated by a certain angle in the same direction by driving the star wheel A 31 and star wheel B 32 alternatively.

The motion train 49 in FIG. 1 is made of gears and engaged with the output gear 45 to receive the rotation and move not-shown hands indicating time.

In the oscillating stepping motor according to the present invention the gear A 41 and gear B 42 coaxial with the two star wheels function to rotate the two star wheels together. This eliminates the need for the teeth of the star wheels A 31, B 32 to be engaged with each other.

Therefore, the tooth shape of the star wheels A 31, B 32 can be designed with only the drive efficiency by the feed teeth A 23, B24 taken into consideration, and it can be optimally designed.

The pinion A 43 of the gear A 41 in FIG. 5 is not used for driving not-shown hands. By engaging the pinion A 43 with a gear as the output gear 45 engaging with the pinion B 44, the rotation of the pinion A 43 can be transmitted to operate the hands for indication of time and other hands.

Further, for the other purpose than the above, the pinion A 43 can be provided coaxially with the gear shaft 40a. This structure matches that of the star wheel B 32, gear B 42, and pinion B 44 which forms a well-balanced rotary element.

Moreover, the gear A 41 can be integrated with the pinion A43 and so can be the gear B 42 and pinion B 44. This can standardize the parts and elements of both and realizes cost-down.

[Phase Relation Between Two Star Wheels: FIG. 6]

Next, the phase relation between the teeth of the star wheels A 31, B 32 is described, referring to FIG. 6.

As shown in FIG. 6, the star wheel A 31 is behind the gear A 41 and slightly shown through six holes of the gear A 41. Likewise, the star wheel B 32 is behind the gear B 42.

The numbers of teeth of the star wheels A 31, B 32 are both 24. The numbers of teeth of the star wheels A 41, B 42 are both 48.

The feed tooth B 24 starts rotating counterclockwise to contact, press and drive one of the teeth of the star wheel B 32.

The teeth of the star wheel A 31 are hidden by those of the gear A 41 in the drawing but located on a radial line L3 indicating a teeth direction which is a virtual line from a center P1 (also center of the gear shaft 40a in FIG. 5) of the star wheel A 31.

The teeth of the star wheel B 32 are located on a radial line L4 as a virtual line from a center P2 (also center of the gear shaft 40b in FIG. 5) of the star wheel B 32.

Further, seen from the centers P1, P2 of the star wheels, a center P0 of the rotor shaft 22 coincides with one radial line L4 and is placed between two radial lines L3. That is, the star wheels and gears are connected in an angular relation so that a direction in which the shafts and teeth of the star wheels are connected is shifted by a half pitch from that in which the shafts of the star wheels and that of the rotor shaft are connected.

This structure aims to alternatively drive the star wheels by a half pitch by the oscillation of the rotor 2. Thereby, the relation between the feed tooth A 23 and star wheel A 31 is completely symmetric and dynamically equivalent relative to that between the feed tooth B24 and star wheel B 32, realizing smooth driving.

This phase relation of the teeth of the star wheels is unchanged in a later description.

The size of the rotor 2 can be smaller than that of the star wheels A 31, B 32, and the inertia moment of the rotor 2 can be reduced, so that it consumes less power. Also, the reduction ratio between the rotor 2 and star wheel A 31 or B 32 can be set to a large value so that the inertia moment of the star wheel A 31 or B 32 to the rotor 2 can be reduced, resulting in decreasing power consumption.

Figure 7:
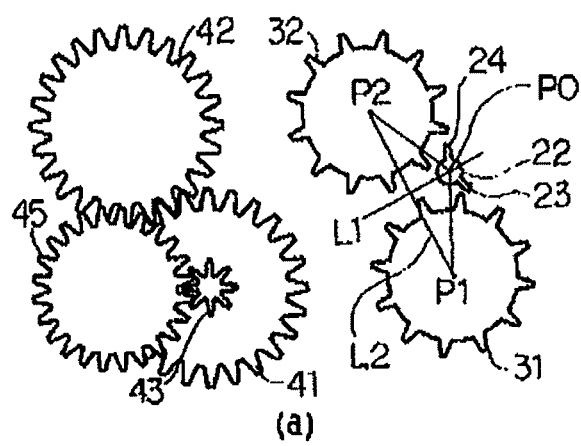
FIG. 7 is a plan view of the essential part to show a first half of the operation according to the first embodiment.
Figure 7:
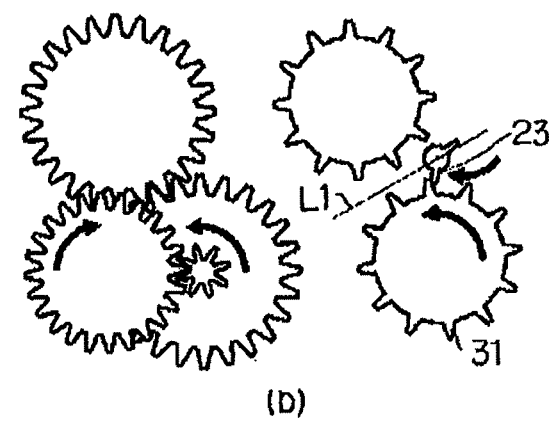
Figure 7:
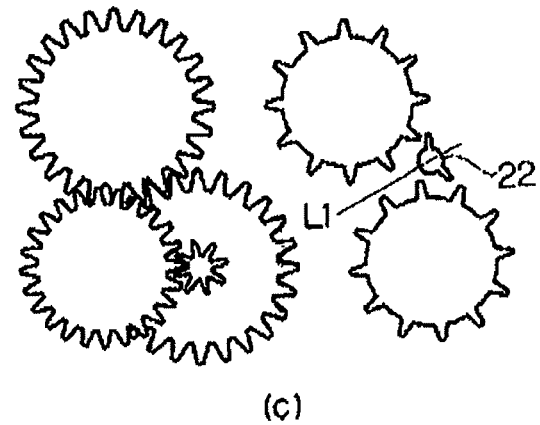
Figure 8:
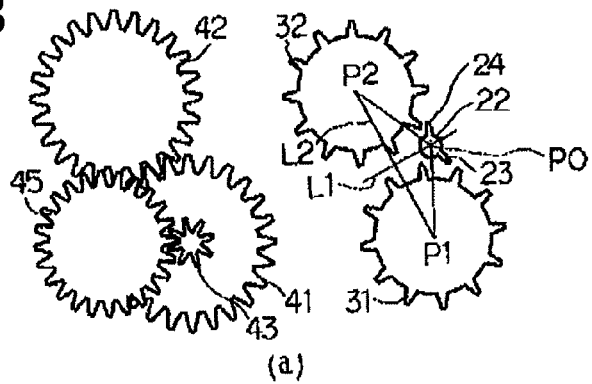
FIG. 8 is a plan view of the essential part to show a second half of the operation according to the first embodiment.
Figure 8:
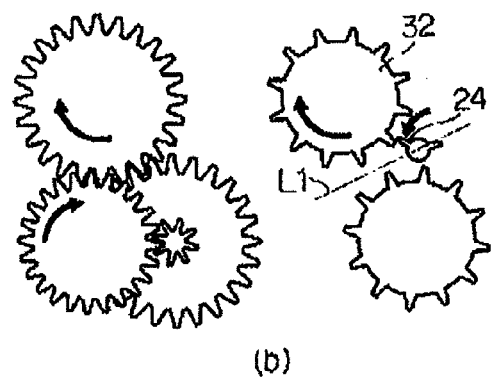
Figure 8:
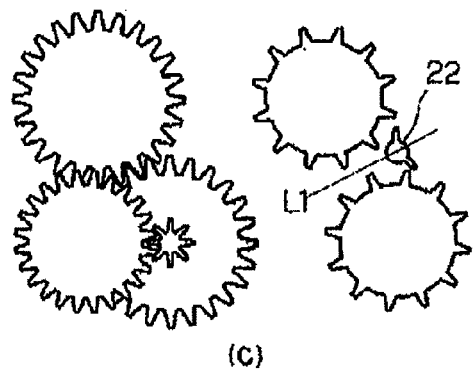

[Neutral Position and Feed Operation: FIGS. 7, 8]

Next, the feed operation of the gears is described referring to FIGS. 7-8.

FIGS. 7 and 8 show each important moment of the feed operation in one cycle of the oscillation driving. For the sake of viewability of the drawing, intrinsically steric structures are depicted as planar and a group of the rotor shaft and star wheels and a group of the gears, pinions, and output gear on the top and bottom of the structures are separately shown in horizontal direction in the drawing.

For viewability the numbers of teeth of the gears and star wheels are different from those in FIG. 6. In the drawing the output gear 45 is different from that in FIG. 6 and engaged with the pinion A 43.

FIG. 7(a) shows the elements immediately before driven. The rotor magnet 21 although not shown faces the neutral direction. As described above, a magnetic restoring force acts between the rotor magnet 21 and the stator 1 by the action of a deformed portion 16 provided in the rotor hole 13 of the stator 1 so that the magnetization of the rotor magnet 21 works to the non-magnetic element 14.

When the rotor magnet 21 or the rotor shaft 22 faces the neutral direction, the feed teeth A 23, B 24 on the rotor shaft 22 also faces a certain direction. FIG. 7(a) shows that the two feed teeth are at the neutral position.

As shown in FIG. 7(a), at the neutral position the feed teeth A 23 and B 24 approach the star wheels A 31, B 32, respectively. A distance in which the feed tooth A 23 approaches the star wheel A 31 is defined to be a first distance while that in which feed tooth B 24 approaches the star wheel B 32 is defined to be a second distance. The second distance is larger than the first distance.

In FIG. 7(a) the feed tooth A23 and the tooth of the star wheel A 31 are very close but do not contact each other, and the feed tooth B 24 is in the vicinity of the center of the tooth pitch of the star wheel B 32.

That is, if the moving direction of the driven rotor 2 is defined to be forward, one tooth of the star wheel A 31 approaches right ahead of the feed tooth A23 most. The center of the pitch between the teeth right before and after the star wheel B 32 approaches ahead of the feed tooth B 24.

The first and second distances change depending on the length of the feed tooth or the number of teeth or shape of the star wheels. It cannot be generally represented in a numeric value. At the rotor in the neutral position, the first and second distances have to be different.

Herein, the direction of the rotor shaft 22 having the center P0 is defined to be along a bisector of the aperture angle of the feed teeth A23, B24. The center of the star wheel A 31 is P1 and that of the star wheel B 32 is P2. The segment of a virtual line connecting the centers P1, P2 is L2 while a virtual line indicating the neutral direction of the rotor shaft 22 is L1.

It is preferable that the line L1 and the segment L2 be a perpendicular bisector in terms of the geometric symmetry of this mechanism.

Furthermore, in the neutral position the feed teeth A23, B24 are outside a triangular area formed by the centers P0, P1, P2, specifically, outside the apex angle P0 of the triangle.

FIG. 7(b) shows that the rotor shaft 22 is rotated at about 45 degrees clockwise (right-hand in the drawing) from the neutral direction by a drive force from a drive current applied to the coil 17, and the feed tooth A23 contacts and rotates one of the teeth of the star wheel A 31 right ahead thereof by a half pitch.

The feed tooth A 23 rotates from the position very close to the one tooth of the star wheel A 31, therefore, it has no idle driving. It can accordingly reduce the rotation angle of the rotor 2 by the drive force from the drive current and reduce power consumption.

In FIG. 7(b) the arrows indicate the rotational directions of the wheels. The star wheel B 32, although not driven, is also rotated by the engagement of the gear A 41 and gear B 42 by a half pitch.

FIG. 7(c) shows that the rotor shaft 22 has finished driving and is rotated counterclockwise (left-hand in the drawing) by the magnetic restoring rotational force of the rotor magnet 21 and stator 1 to return in the neutral direction. That is, the feed teeth A23, B24 also return to the neutral position along with the rotor shaft 22.

However, in detail the angle of the star wheels and gears are advanced by the feed amount in the previous step.

FIG. 8(a) is the same drawing as FIG. 7(c) and shows that the rotor shaft 22 is about to rotate counterclockwise from the neutral direction.

Here, a distance between the feed teeth A 23, B 24 and the star wheels changes from that in FIG. 7(a) and the feed tooth B 24 and one tooth of the star wheel B 32 ahead approach most. The feed tooth A 23 approaches near the center of the pitch between the two teeth ahead and behind the star wheel A 31.

That is, the first distance is a distance between the feed tooth B 24 and the star wheel B 32 close to each other while the second distance is a distance between the feed tooth A 23 and star wheel A 31 close to each other. In this case the second distance is also larger than the first distance.

FIG. 8(b) shows that the rotor shaft 22 is rotated at 45 degrees counterclockwise by the drive force and the feed tooth B24 rotates a tooth of the star wheel B 32 ahead clockwise by a half pitch of the tooth.

FIG. 8(c) shows that the rotor shaft 22 has finished driving, returns in the neutral direction (or neutral position) by the magnetic restoring force, and the star wheels and gears are advanced. FIG. 8(c) is the same as FIG. 7(a) except for the advanced rotary positions of the gears.

As described above, the oscillating stepping motor according to the present invention repeats the cycle of motion as shown in FIG. 7(a) to FIG. 8(c) to continuously operate the hands connected to the output gear 45.

[Angle of Two Feed Teeth]

Next, the aperture angle between the two feed teeth A 23, B 24 provided on the rotor shaft 22 is described.

In view of the object of the present invention, it is important that (1) each feed tooth approaches closely, one tooth of the star wheel driven next, (2) the teeth of the star wheel are driven at a half pitch at a small angle as possible, and (3) after driving the returning feed tooth is prevented from hooking the front side of the teeth of the driven star wheel (slight contact is permissible but the star wheel must not be returned to the original angle).

The aperture angle between the feed teeth A 23, B 24, tooth pitch of the star wheel A 31 and star wheel B 32, the tooth shape of the star wheels need to be set to satisfy in a balanced manner the conditions as the approach distance between the tooth of the star wheel and feed tooth, a required angle of the teeth of the star wheels, and substantive incoherence condition between the teeth of the star wheels and feed teeth.

Especially, the substantive incoherence between the teeth of the star wheels and feed teeth is indispensable for the reliability of the feed operation.

The numbers of the teeth of the star wheels and gears as shown in the drawings are determined by the size of an analog electronic timepiece incorporating the oscillating stepping motor according to the present invention. Therefore, the number of teeth cannot be defined generally and a required angle of the teeth of the star wheels cannot be defined at a specific numeric value. However, the tooth shape and the teeth positions in FIGS. 6 to 8 satisfy the incoherence condition.

Figure 9:
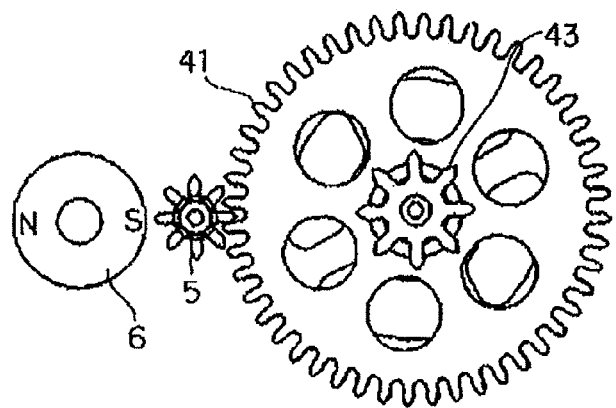
FIG. 9 is a plan view of the essential part of a holder according to the first embodiment.

[Holder at Star Wheel Position: FIG. 1, FIG. 9]

Next, a holder to prevent an angular displacement of the star wheels and gears is described, referring to FIG. 1 and FIG. 9.

The angles of the star wheels A 31, B 32 and gears A41, B42 while not driven by the feed teeth A23, B24 may be shifted due to disturbance and pose a problem with the next drive or operation. The oscillating stepping motor according to the present invention comprises a holder in order to prevent that from occurring. The holder is described referring to a mechanism to engage with the gear A 41 by way of example.

FIG. 9 is a plan view of the holder. The gear A 41 engages with the magnet pinion 5 made from a magnetic material. The cylindrical or ring-like magnet 6 magnetized along the diameter is disposed to approach one tooth of the magnet pinion 5, for example. The rotational shaft of the magnet pinion 5 and magnet 6 are fixed on a not-shown bottom plate or else.

The magnet 6 attracts the closest tooth of the magnet pinion 5 to maintain its position. Because of this, the teeth of the star wheel A 41 can be set at a certain position (immediately before driving) as long as it includes a proper number of teeth. Such a magnetic holder excels owing to a lack of fiction loss.

In attracting the closest tooth of the magnet pinion 5, the magnet 6 generates a torque to rotate the magnet pinion 5, and the torque acts on the gear A 41 and rotates it. This makes it possible to rotate the gear A 41 at a necessary angle by the torque on the magnet 6 even if the period in which the drive current flows is shortened and the moving area of the feed tooth A23 by the torque from the drive current is narrowed to shrink the rotation angle of the gear A 41 by the feed tooth A23. Thus, the angle at which the gear A41 is rotated by the drive current can be reduced, achieving low power consumption.

FIG. 9 shows an example of the holder provided on the side of the gear A 41, however, it should not be limited to such an example. It can be provided on the side of the gear B 42 and near both of the gears A 41, B 42.

With no sufficient space available for the magnetic holder, a simple friction element can be provided as the holder for the star wheels and gears.

Although not shown, a thin disc spring as a receptacle can be provided on the gear shaft, a lateral spring can be hooked on the side face of the tooth of the star wheel or a spring member with a mount head can be hooked on the tooth of the star wheel.

Figure 10:
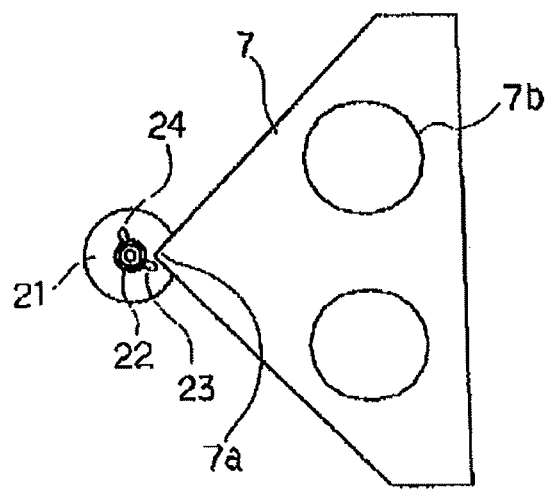
FIG. 10 is a plan view of the essential part of a rotation restricting element according to the first embodiment.
Figure 11:
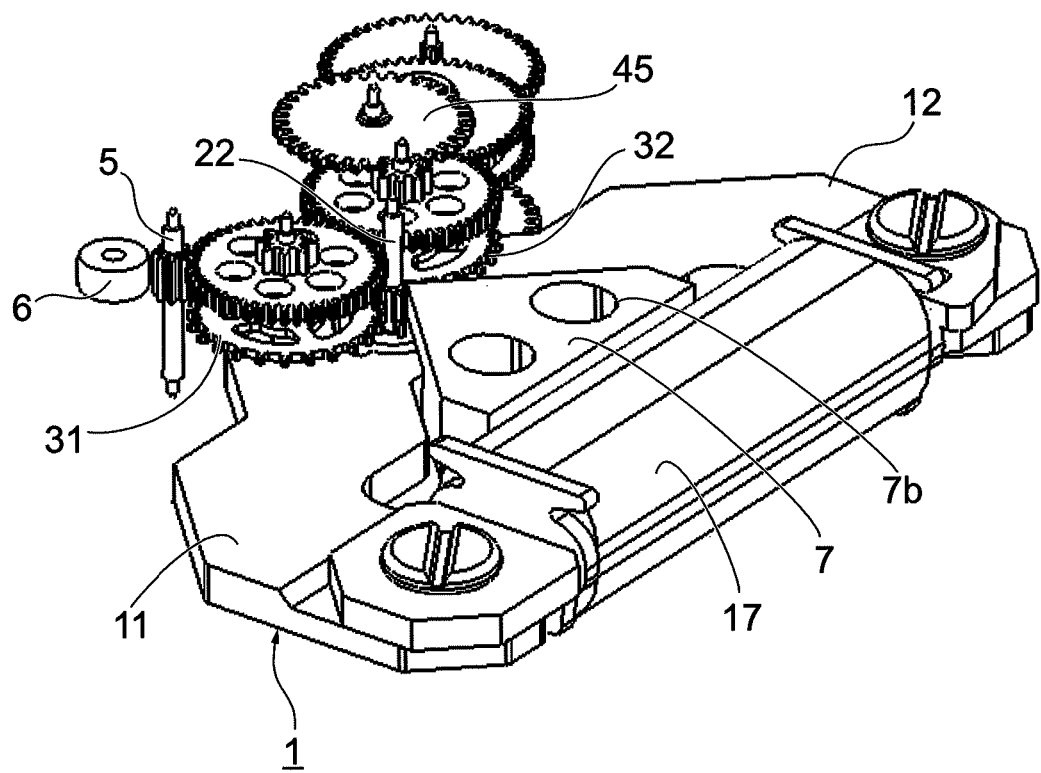
FIG. 11 is a perspective view of the rotation restricting element according to the first embodiment.

[Rotation Restricting Element: FIGS. 10 to 11]

Next, a rotation restricting element to prevent the rotor from anomalously rotating is described referring to FIGS. 10 to 11.

A wrist watch incorporating the oscillating stepping motor according to the present invention may receive a large impact from falling to cause an anomalous rotation of the rotor due to disturbance. For example, with a 180-degree rotor rotation, the phase (rotation direction) of the next oscillation may be reversed, and the rotor cannot operate normally. To prevent this, the oscillating stepping motor comprises a rotation restricting element.

FIG. 10 is a plan view of the rotation restricting element and FIG. 11 is a perspective view thereof. The planar shape of the rotation restricting element is triangular as shown in the drawings.

The rotation restricting element is fixed on the stator 1 or the not-shown bottom plate and a tip end 7a thereof is inserted into the motion trajectory of the not-shown feed teeth A 23, B 24. In FIG. 10 the tip end 7a is placed between the feed teeth A 23, B 24 at a certain aperture angle, for example.

The rotation restricting element 7 includes two holes 7b for instance for the sake of weight saving in the drawings. For assembly of the oscillating stepping motor according to the present invention, the holes 7b are convenient to see the elements below therethrough.

With such a configuration, the rotation restricting element interferes with the feed teeth to surely restrict the moving area thereof.

FIG. 11 is a perspective view seen from the same direction as in FIG. 1 and shows the rotation restricting element provided beside the coil 17 by way of example. This is merely an example and another element can be used. For instance, a rod-like rotation restricting element 7 is prepared and the end portion thereof can be fixed on the stator A11 or B12, to fit the tip end 7a into the motion trajectory of the feed teeth A23, B24.

The rotation restricting element includes the holes 7b and does not require a strength. The shape thereof can be freely changed as long as it can prevent the anomalous rotation of the feed teeth.

Example of the First Embodiment

FIG. 12

Next, one example of the first embodiment is described with reference to FIG. 12.

Figure 12:
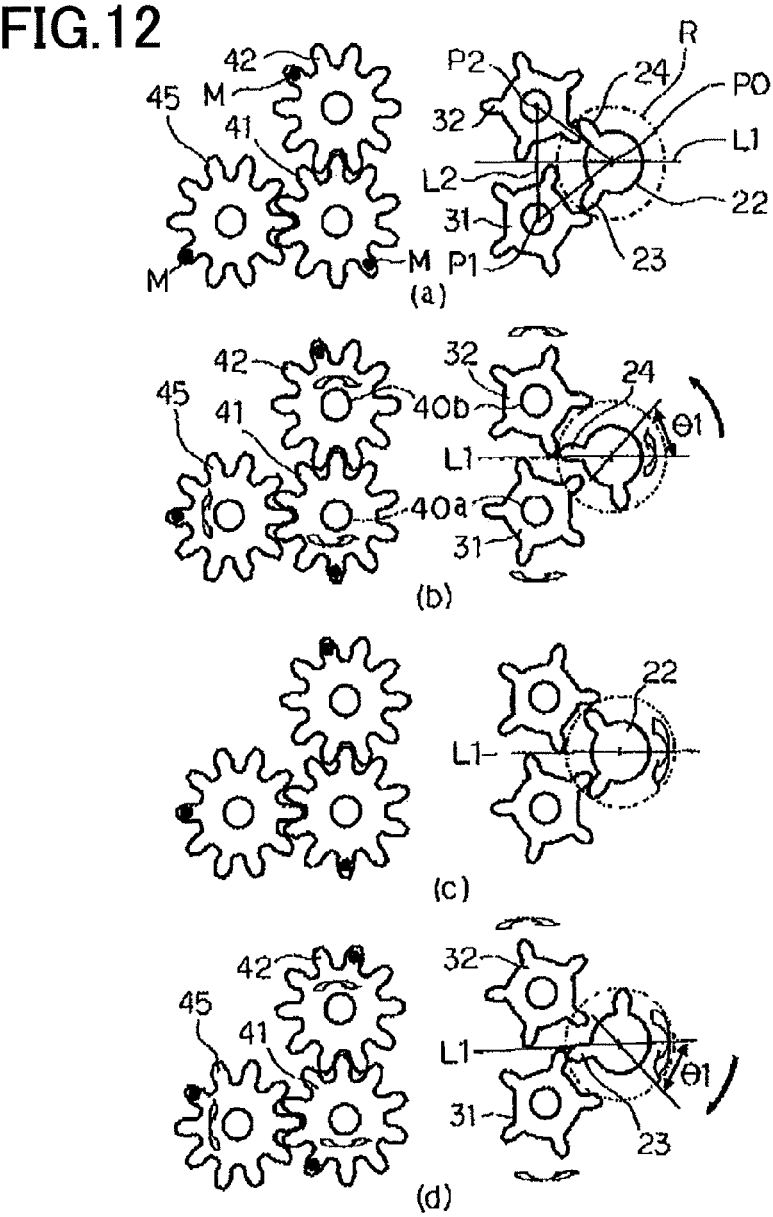
FIG. 12 is a plan view of the essential part of an example of the first embodiment.

FIG. 12 is a plan view of the essential parts at important moments of the feed operation in a single oscillation driving cycle. For the sake of viewability as in FIGS. 7 to 8, intrinsically steric structures are depicted as planar and a group of the rotor shaft and star wheels and a group of the gears, pinions, and output gear on the top and bottom of the structures are separately shown in horizontal direction.

In this example the number of the teeth of the star wheels A 31, B 32 is reduced as much as possible, for example, to 5 in FIG. 12.

In FIG. 12 the star wheel A 31 and the gear A 41 are coaxial with the gear shaft 40a while the star wheel B 32 and the gear B 42 are coaxial with the gear shaft 40b. The output gear 45 directly engages with the gear A 41 without a pinion.

As described above, the center of the rotor shaft 22 is P0, that of the star wheel A 31 is P1 and that of the star wheel B 32 is P2. The segment of a virtual line connecting the centers P1, P2 is L2 while a virtual line indicating the neutral direction of the rotor shaft 22 is L1. It should be noted that the difference from the above example is in the orientation of the feed teeth A 23 and B 24. The aperture angle is set to about 110 degrees. The positions of the feed teeth are unchanged and outside the triangle formed by the centers P0, P1, P2.

Further the gear A 41, gear B 42, and output gear 45 each includes one tooth marked with a black circle M so that the rotation angle can be tracked in sequence.

FIGS. 12(a) to 12(d) are more simplified than FIGS. 7 and 8 and show one cycle of oscillation driving.

FIG. 12(a) shows that the rotor shaft 22 is in the neutral direction immediately before start of a single oscillation driving cycle.

The tooth of the star wheel B 32 first fed is inside the rotational trajectory R of the feed tooth indicated by the dashed line in the drawings and in front of the feed tooth B 24. The teeth of the star wheel A 31 are shifted therefrom by a half pitch and outside of the rotational trajectory R.

In FIG. 12(b) the feed tooth B 24 is rotated at angle θ1 counterclockwise (left-hand in the drawing) to drive the star wheel B 32 by a half pitch. The angle θ1 is about 50 degrees.

In FIG. 12(c) the first half of the driving has completed and the rotor shaft 22 is returned in the neutral direction by a magnetic restoring force.

In FIG. 12(d) the feed tooth A 23 is rotated at angle θ1 clockwise (right-hand in the drawing) to drive the star wheel A 31 by a half pitch. Then, the rotor shaft 22 and the teeth of the star wheels are brought back in the state in FIG. 12(a), which ends the driving by a single oscillation cycle. However, the rotation of each gear is advanced. Needless to say that each feed tooth never interferes with the other tooth other than that which it drives in the restoring process.

As described above, according to the oscillating stepping motor in the present invention the number of the teeth of the star wheels A 31, B 32 and the orientation and aperture angle of the feed teeth A 23, B 24 can be freely changed. The positions of the respective elements matter but the number of the teeth of the star wheels and the angle of the feed teeth are freely changeable according to the specification of an analog electronic timepiece incorporating the oscillating stepping motor according to the present invention.

[Examination of the Rotation: FIGS. 1 to 3, FIG. 13]

Figure 13:
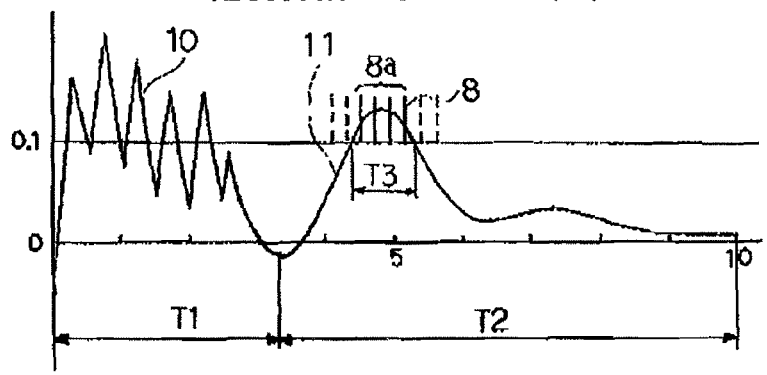
FIG. 13 is a graph to examine the rotation of the rotor.

Next, a technique for examining the operation of the oscillating stepping motor using a signal extracted from the motor, mainly referring to a waveform graph in FIG. 13.

FIG. 13 shows detected pulses 8, and the waveform 10, 11 of the current flowing through the coil.

FIG. 13 shows the waveform of a current flowing through the coil 17 in a single driving. The signal is acquired from the coil 17 and can be extracted easily by a known current detecting circuit.

The waveform in the graph includes a period T1 (waveform 10) in which the rotor 2 is driven in one direction by the supply of the drive current from the stator 1 and a period T2 (waveform 11) in which a single (one side) driving has completed and the rotor 2 damped-oscillates by restoring force, generates a back electromotive force, and converges in the neutral direction. The rest of the waveform is omitted.

The waveform 10 in the period T1 sharply fluctuates because an intermittent drive voltage as several small divided pulses is applied to the coil 17. Such a driving is generally applied for the full rotation type stepping motor. Alternatively, the stepping motor can be driven by a single pulse in an appropriate width.

The execution or non-execution of an intended driving is examined in the period T2. The waveform of the back electromotive force by free oscillation is large in amplitude when the rotor is rotated largely and small when the rotor is not rotated largely. In the period T2 test pulses 8 in a constant width are generated. Then, in a test period T3 in which the waveform 11 is equal to or over a certain detection level (0.1 mA, for example), the number of detected pulses 8 is measured by a known measure circuit. In FIG. 13 the test pulses indicated by the solid line 8a are over the certain detection level and the number thereof is four.

For example, it is assumed that the number of test pulses, four, is normal and the driving (feed operation) of the rotor is normally performed. The drive pulses in the same waveform and inverse polarity as the previous pulses are applied next time.

If the number of detected pulses in the period T3 is 1 to 3, for example, it is determined that the rotation is insufficient and any of the width, number, and voltage of the drive pulses is increased next time.

If the number of detected pulses is 0 in the period T3, it is determined that no rotation has occurred, and drive pulses are supplied in the same direction to drive the rotor again.

If the number of detected pulses is 5 in the period T3, it is determined that the rotation is excessive and the power of the drive pulses is decreased next time. Alternatively, to detect the rotation using the waveform of the current flowing through the coil, drive pulses enough to move the feed tooth A 23 or B 24 to collide with the rotation restricting element 7 is applied to the coil, to find a change in the current waveform and certainly determine the rotation at a necessary angle. Moreover, the rotation at a necessary angle can be determined from correlation data of an interval between peak values of the current waveform flowing into the coil and the rotation angle.

Thus, the operation of the oscillating stepping motor according to the present invention can be examined as a known stepping motor, using the current waveform flowing into the coil at a single driving.

Second Embodiment

Second Embodiment

Figure 14:
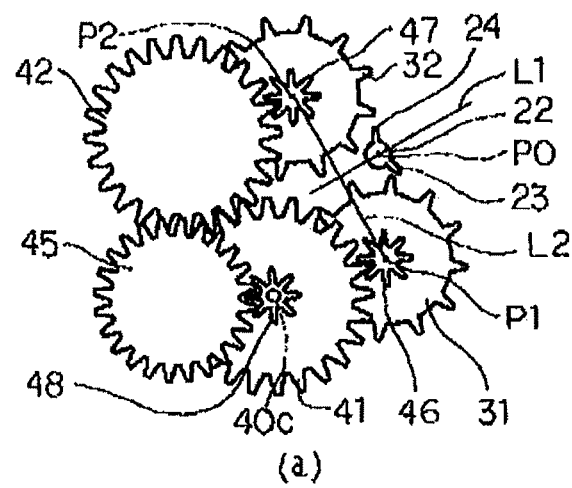
FIG. 14 is a plan view of the essential part to show a first half of the operation according to the second embodiment.
Figure 14:
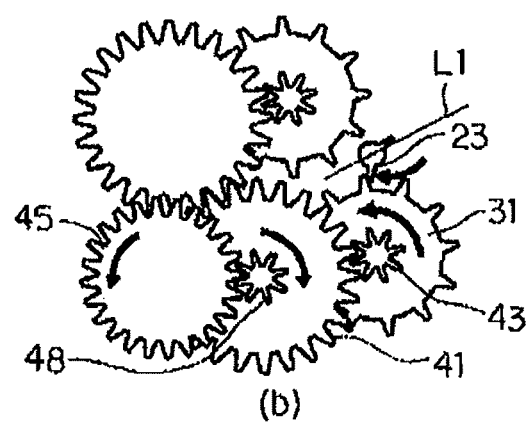
Figure 14:
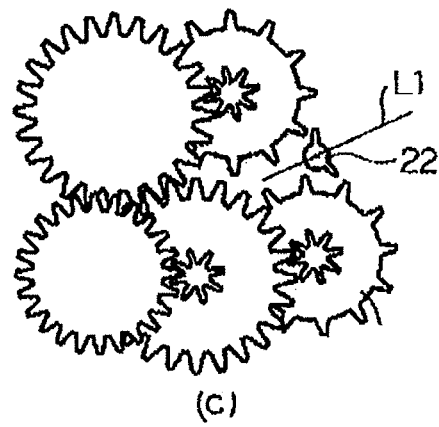
Figure 15:
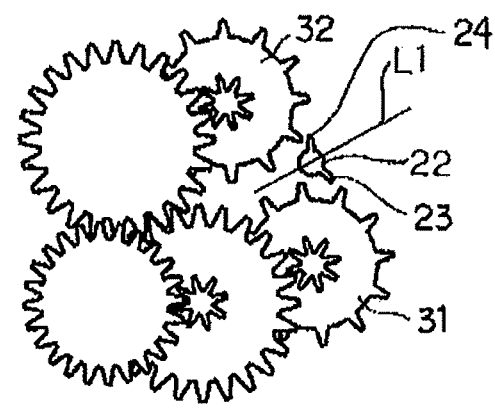
FIG. 15 is a plan view of the essential part to show a second half of the operation according to the second embodiment.
Figure 15:
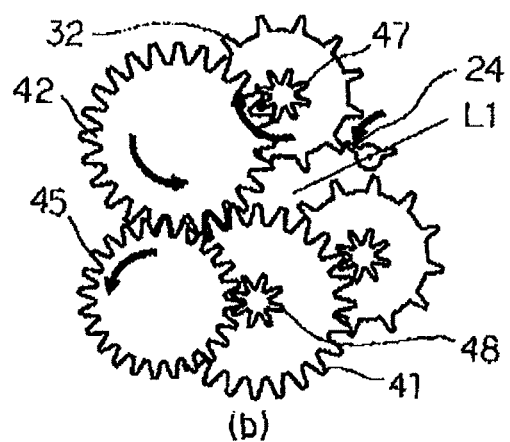
Figure 15:
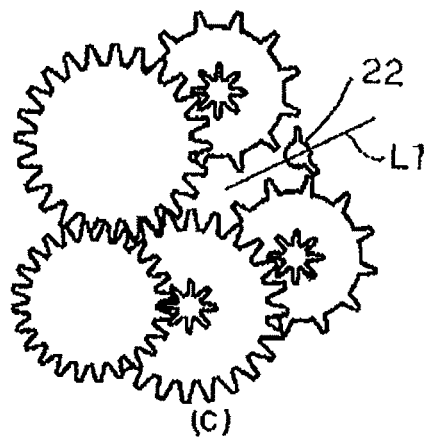
Figure 16:
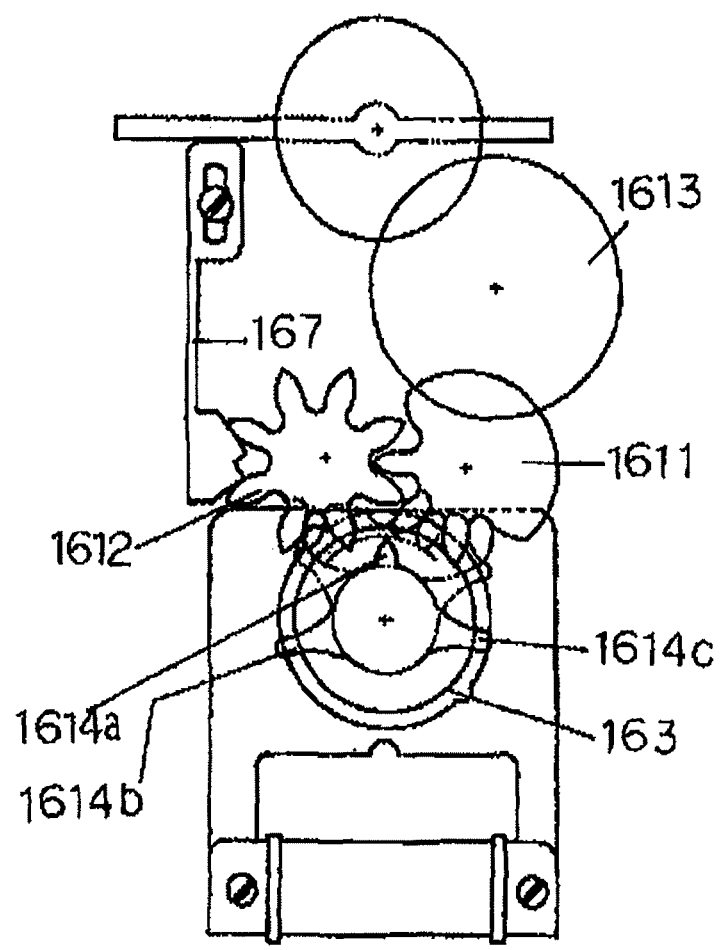
FIG. 16 is a plan view of the essential part of the related art in Patent Document 1.
Figure 17:
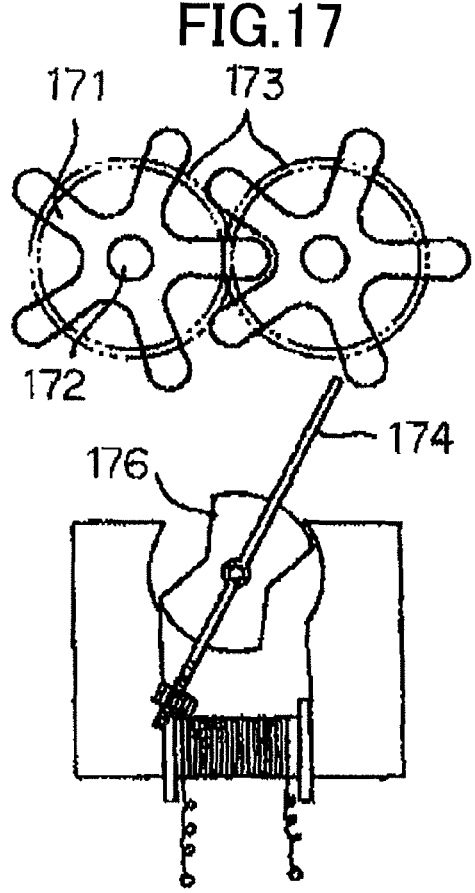
FIG. 17 is a plan view of the essential part of the related art in Patent Document 2.
Figure 18:
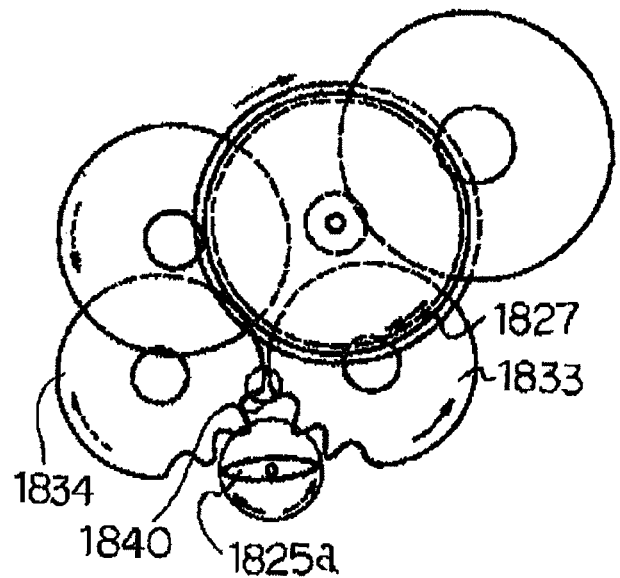
FIG. 18 is a plan view of the essential part of the related art in Patent Document 3.

FIGS. 14 to 15

Next, a second embodiment of the oscillating stepping motor is described with reference to FIGS. 14, 15 which are plan views of the essential parts and operation thereof.

The difference between the second embodiment and first embodiment is in that the gears A 41, B 42 are not coaxial with the gear shaft 40a and star wheel 32B and connected with each other via another gear (pinion). The associated connection between the gear A 41 and gear B 42 and the star wheel A 31 and gear A 41 is unchanged.

First, the structure thereof is described.

FIGS. 14, 15 show a gear shaft 40c, a pinion C 46, a pinion D 47, and a pinion 48E. The pinion C 46 and star wheel A 31 are coaxial with the not-shown gear shaft 40a, the pinion D 47 and star wheel B 32 are coaxial with the not-shown gear shaft 40b, and the pinion 48 E and star wheel A 41 are coaxial with the gear shaft 40c.

The relation between the star wheels A 31, B 32 and the feed teeth A23, B24 is the same as in the first embodiment.

The gear A 41 is engaged with the pinion C 46 and the gear B 42 is engaged with the pinion D 47. As in the first embodiment, the gears A 41, B42 are engaged with each other, and the output gear 45 is engaged with the pinion E 48 and connected with a not-shown train wheel to drive the hands. The plan view in FIG. 14 does not show the positions of the star wheels and gears, however, the output gear 45 is engaged only with the pinion E 48.

The number of the teeth of the output gear 45 is unchanged between FIG. 14 and FIG. 1 for the sake of viewability of the drawings. Needless to say that the reduction ratio of the output gear 45 is appropriately set for accurately driving the not-shown hands.

Thus, in the second embodiment the gears A 41, B 42 and the star wheel A 31, B 32 are not coaxial and both are connected via the pinions C, D for deceleration. Therefore, the moment of inertia ratio of the gears A 41, gear B 42 decreases in inverse proportion to the square of speed ratio from the rotor shaft 22 so that the inertia load of the rotor shaft 22 can be reduced. Thereby, the oscillating stepping motor according to the second embodiment can be more easily driven and reduce the amount of necessary energy in comparison with that in the first embodiment.

Next, the operation thereof is described.

The operation in FIGS. 14, 15 is simply described since it is similar to that in the first embodiment in FIGS. 7 and 8.

In FIG. 14(a) the rotor shaft 22 is in the neutral direction 24 immediately before the operation and so are the feed teeth A 23, B. At the neutral position one tooth of the star wheel A 31 approaches ahead of the feed tooth A23 most and the feed tooth B24 and one tooth of the star wheel B 32 approach relatively but are still in a far distance.

In FIG. 14(b) by a drive force from the drive current applied to the coil 17, the rotor shaft 22 is rotated at about 45 degrees clockwise from the neutral direction, the feed tooth A23 contacts and rotates one tooth of the star wheel A 31 ahead at a half pitch. The arrows in the drawings indicate rotational directions.

In FIG. 14(c) the driving has completed, and the rotor shaft 22 is moved counterclockwise by the magnetic restoring force of the rotor magnet 21 and stator 1 to return in the neutral direction (although the teeth are advanced).

FIG. 15(a) is the same as FIG. 14(c) and shows that the rotor shaft 22 is about to rotate counterclockwise from the neutral direction.

Here, the distance between the feed teeth A 23, B 24 and the teeth of the star wheels changes from that in FIG. 14(a). The feed tooth B 24 is closest to one tooth of the star wheel B 32 ahead and the feed tooth A 23 and one tooth of the star wheel A 31 approach each other relatively but are still far.

In FIG. 15(b) the rotor shaft 22 is rotated at 45 degrees counterclockwise by the drive force and the feed tooth B24 rotates the teeth of the star wheel B 32 ahead by a half tooth pitch clockwise.

In FIG. 15(c) the driving has completed, the rotation of the star wheels and gears are advanced, and the rotor shaft 22 is returned to be in the neutral direction by the magnetic restoring force. FIG. 15(c) is the same as the FIG. 14(a) except for the gears rotated forward.

The above embodiments describe an example of the driving wheels comprising the star wheels and gears. However, it can comprise either of them. For example, it can comprise star wheels formed in appropriate shape and size.

It is important to configure the rotor with two feed teeth so that it can oscillate in one direction to feed one of the driving wheels and oscillate in the other direction to feed the other driving wheel.

Other Examples

Aside from the above embodiments and example, various allowable possibilities are now described without impairing the operation and effects of the present invention.
(1) The structure that the shapes of the two feed teeth, the standby positions in neutral state, and the numbers and shapes of the two star wheels are all different from each other.
(2) The structure with the rotor shaft 22 being neutral in asymmetric directions. For example, the line L1 indicating the neutral direction does not coincide with the perpendicular bisector of the centers P1, P2.
(3) The rotor magnet 21 is configured so that at the neutral position the magnetic pole faces a direction shifted from the non-magnetic element 14 as a connecting portion of the stators A 11, B 12. In this case the waveform of alternatively generated drive pulses may be changed to change the drive force by the orientation of the oscillating rotation.
(4) The structure with the two star wheels having teeth shifted at a pitch other than a half pitch.
(5) It is possible to reduce the power consumption of the stepping motor from a related art stepping motor having a full rotating rotor by suppressing the inertia load even at a low drive frequency (one to several times per second, for instance).

Third Embodiment

The above embodiments (first and second embodiments and one example) describe an example of the feed teeth 23, 24 having the shape of gear teeth to press and feed the star wheels 31, 32, respectively. The feed teeth of the oscillating stepping motor according to the present invention should not be limited to such an example.

Figure 19:
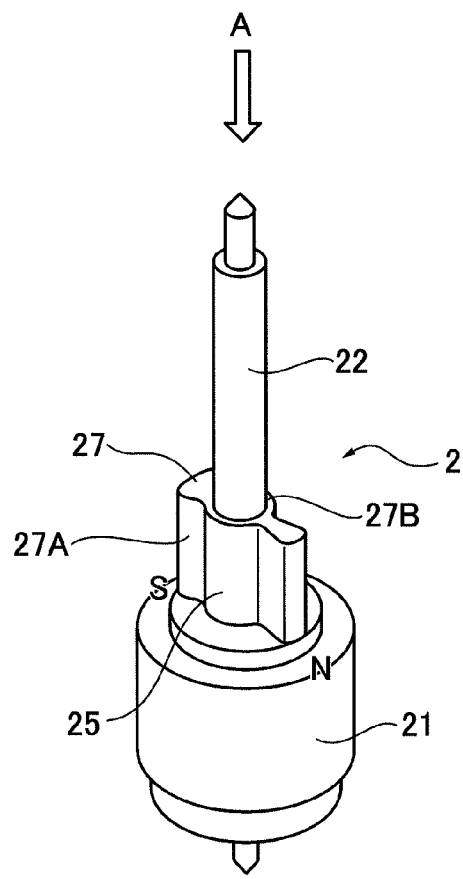
FIG. 19 is a perspective view of a rotor according to a third embodiment.
Figure 20:
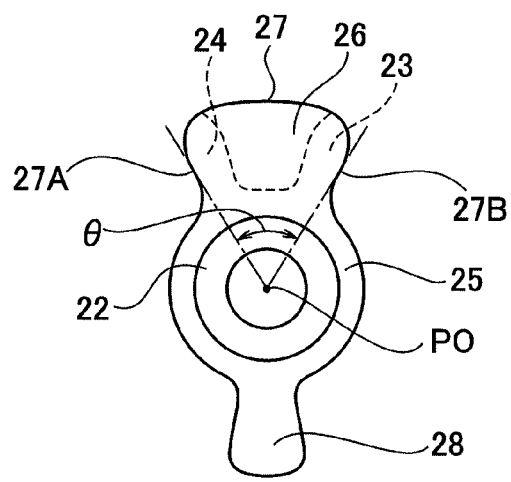
FIG. 20 is a plan view of the rotor according to the third embodiment as seen from the arrow A in FIG. 19.

That is, the feed teeth 23, 24 can be formed as a cam 27 as shown in the perspective view of FIG. 19 and the plan view of FIG. 20, for instance.

Specifically, the cam 27 is formed by enclosing a space 26 between the two feed teeth 23, 24 with a curved face connecting the tooth tips between the feed teeth 23, 24.

Then, the respective faces (tooth faces) of the feed teeth in contact with the star wheels 31, 32 work as cam faces 27A, 27B on both ends of the cam 27 to feed the star wheels 31, 32, respectively by the rotation of the rotor 2.

The cam 27 is a part of the rotor pinion 25 as the feed teeth 23, 24.

Further, the rotor pinion 25 includes a convexity 28 in a portion opposite to the portion including the cam 27 over the oscillation center P0 of the rotor 2. The convexity protrudes outward along the radius of the rotor 2.

The convexity 28 is configured to hit a later-described rotation restricting element 50 to physically limit the range of oscillation angle of the rotor 2.

In the above embodiments, due to the oscillation of the rotor 2 the feed teeth 23, 24 feed the star wheels 31, 32 in a direction so that the teeth of the star wheels in contact with those of the feed teeth 31, 32 approach each other.

This is because the two feed teeth 23, 24 of the rotor 2 are disposed outside the triangle formed by connecting the centers P1, P2 of the star wheels 31, 32 and that P0 of the oscillation of the rotor 2 as shown in FIG. 7(a).

Figure 21:
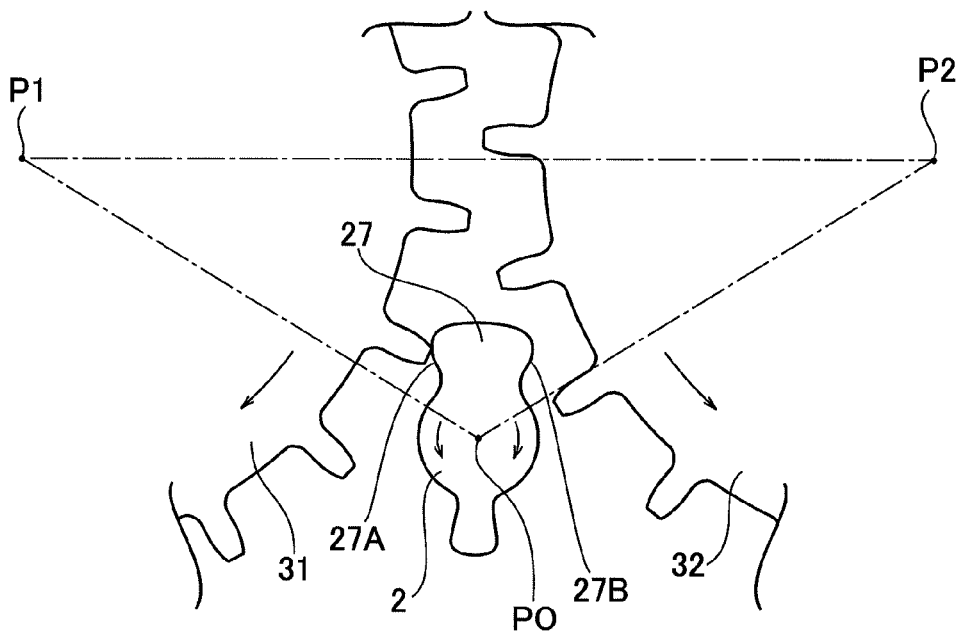
FIG. 21 is a plan view of the position of a cam face and equivalent to FIG. 20.

Meanwhile, in the third embodiment the cam 27 (at least cam faces 27A, 27B on both end thereof) of the rotor 2 is placed inside the triangle (indicated by the dashed line) by connecting the centers P1, P2 of the star wheels 31, 32 and that of the oscillation of the rotor 2, as shown in FIG. 21.

When the rotor 2 oscillates around the center P0 counterclockwise in the drawing, the cam face 27A presses the teeth of the star wheel 31 to rotate it clockwise around the center P1. When the rotor 2 oscillates around the center P0 clockwise, the cam face 27B presses the teeth of the star wheel 32 to rotate it counterclockwise around the center P2.

As a result, by the oscillation of the rotor 2 the cam faces 27A, 27B feed the star wheels 31, 32 in a direction such that the teeth of the star wheels 31, 32 are separated from each other.

Thus, by placing the cam 27 of the rotor 2 inside the triangle formed by connecting the centers P1, P2 of the star wheels 31, 32 and the oscillation center P2 of the rotor 2, the cam faces 27A, 27B can approach the teeth of the star wheels 31, 32 extremely closely, respectively. This can further shorten the idle distance taken for the cam 27A to contact the teeth of the star wheel 31 from that in the above embodiments.

Likewise, the idle distance taken for the cam 27B to contact the teeth of the star wheel 32 can be shortened from that in the above embodiments.

Accordingly, it is possible to realize a reduction in the power consumption of the stepping motor by reducing the idle distance.

Figure 22:
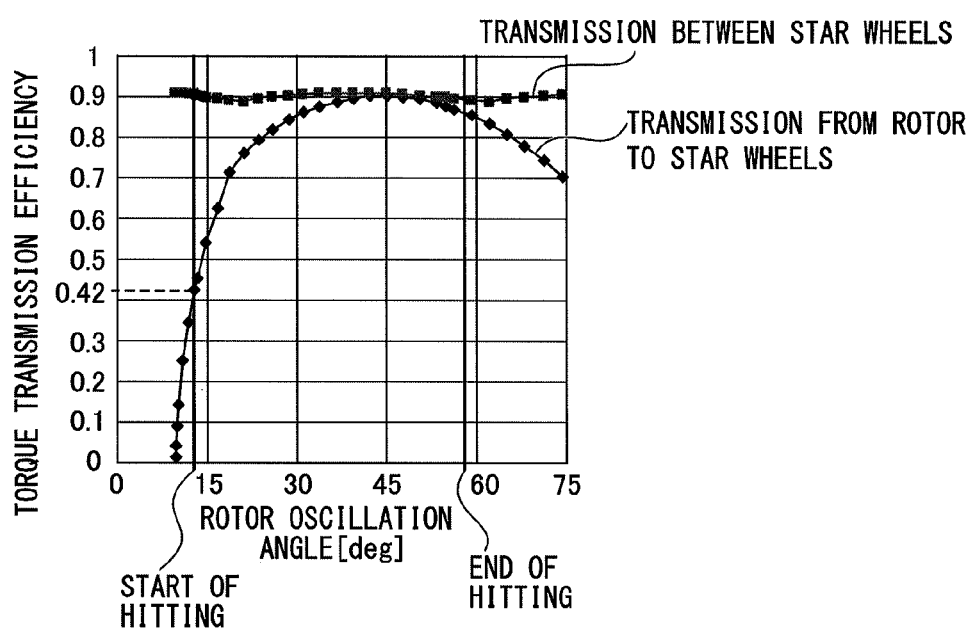
FIG. 22 is a graph showing a relation between the oscillation angle of the rotor and torque transmitting efficiency according the first and second embodiments.
Figure 23:
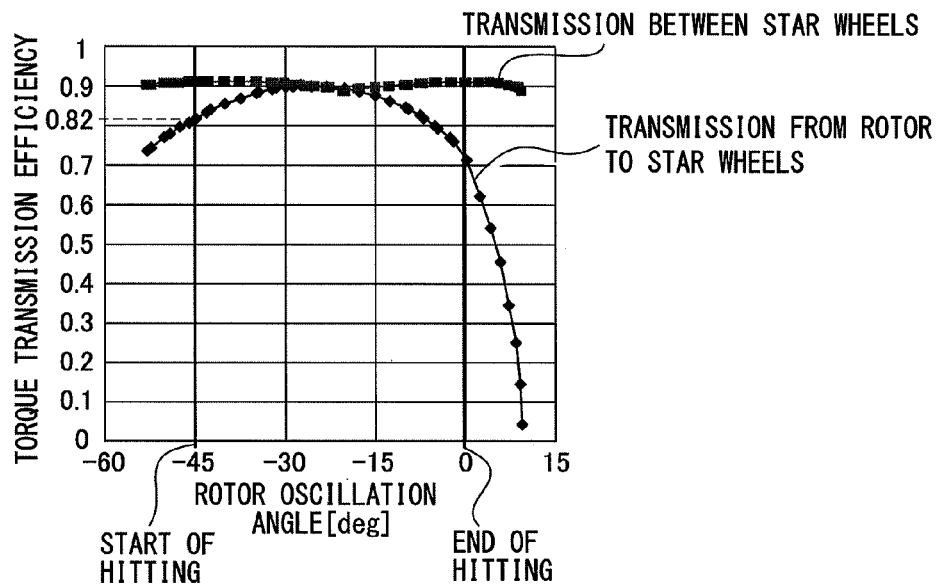
FIG. 23 is a graph showing a relation between the oscillation angle of the rotor and torque transmitting efficiency according the third embodiment.

Further, in the third embodiment the cam faces 27A, 27B contact large-radius arc portions of the tooth faces of the star wheels 31, 32 at the beginning. Meanwhile, in the first embodiment the faces of the feed teeth 23, 24 start contacting small-radius arc portions of the tooth faces of the star wheels 31, 32 so that torque transmission efficiency from the rotor 2 to the star wheels 31, 32 is about 42[%] at a start of hitting (rotor 2's oscillation angle of 15 degrees) as shown in FIG. 22. In the third embodiment at a start of hitting (rotor 2's oscillation angle of 45 degrees) torque transmission efficiency from the rotor 2 to the star wheels 31, 32 is about 82[%] much larger than 42%, as shown in FIG. 23.

According to the third embodiment, therefore, the driving performance of the rotor 2 to start rotating the star wheels 31, 32 in a still state can be improved from that in the first embodiment, which can further improve power use efficiency.

Moreover, from the start to end of the rotor 2's hitting the star wheels 31, 32 (rotor 2's oscillation angle range of 15 to 60 degrees in the first embodiment, that of −45 to 0 degrees in the third embodiment), a change range of the torque transmission efficiency is also smaller in the third embodiment than in the first embodiment. Because of this, it is possible to reduce a fatigue of the teeth of the rotor 2 and star wheels 31, 32 and improve the durability thereof from those in the first embodiment.

Further, if the gears stop at positions shifted from expected positions, a high torque transmission efficiency can be maintained and the stepping motor can stably operate.

Moreover, the size of the rotor 2 can be decreased to reduce the inertia moment in view of oscillation efficiency.

Further, the downsizing of the rotor 2 makes it possible to set a large reduction ratio defined by the engagement of the star wheels 31, 32 and the gear 41, 42 driving together, which can realize a further reduction in power consumption.

In the third embodiment the angle θ between the cam faces 27A, 27B of the rotor 2 around the oscillation center P0 is set to 45 degrees, for instance. The angle between the cam faces should not be limited to this angle. It can be arbitrarily set in accordance with the height of the teeth of the star wheels 31, 32 or the distance from the oscillation center P0 of the rotor 2 to the outer circumference of the cam 27 along the radius.

Figure 24:
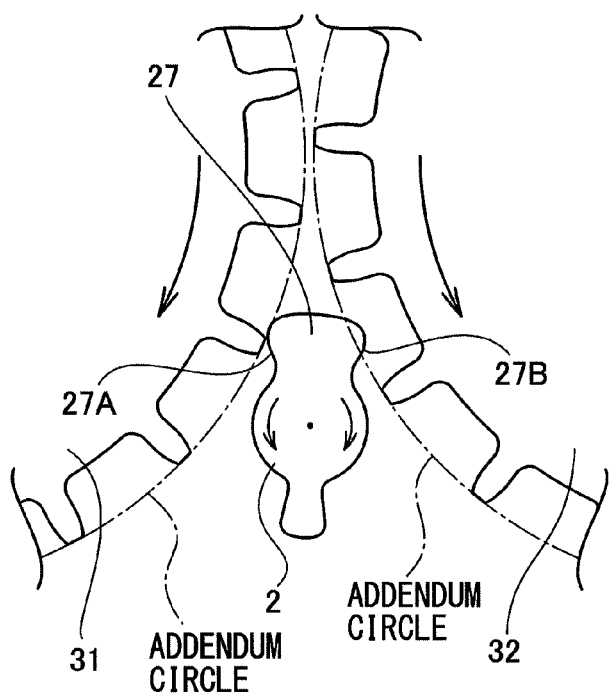
FIG. 24 shows that the cam face is located in the addendum circle of the teeth of the star wheels.

In the third embodiment the cam 27 is formed so that at least either of the two cam faces on both ends is constantly disposed inside the addendum circle (indicated by the chain double-dashed line in FIG. 24) of either of the star wheels 31, 32.

This remains unchanged even when the rotor 2 is at the neutral position. As a result, the star wheels 31, 32 fed by the cam faces 27A, 27B due to the power (inertia) of the rotation can be prevented from excessively rotating since the teeth of either the star wheel 31 or 32 hit the cam 27 in the addendum circle thereof. Thus, it is made possible to prevent a decrease in the accuracy for the indication of the hands caused by the excessive rotation of the star wheels 31, 32.

Figure 25:
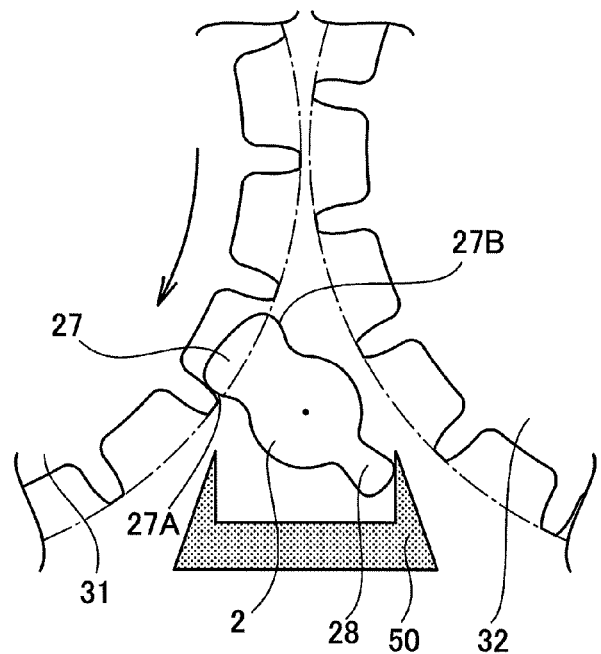
FIG. 25 shows a relation between the convexity of the rotor and a rotation restricting element hit by the convexity.

The oscillating stepping motor according to the third embodiment comprises the rotation restricting element to hit the convexity 28 of the rotor 2 at both ends of the oscillation angle range (−45 to 0 degrees, for instance), as shown in FIG. 25. The rotor 2 can be certainly avoided from excessively rotating beyond the oscillation angle range since the convexity 28 physically hits the rotation restricting element 50 at both ends of the range.

In addition, the rotation restricting element 50 can be placed in a distance from the rotor shaft 22 in accordance with the length of the convexity 28 (along the radius of the rotor 2). Accordingly, the length of the convexity 28 can be short so that the total size of the rotor 2 can be downsized to reduce the inertia moment thereof and reduce power consumption.

Figure 26:
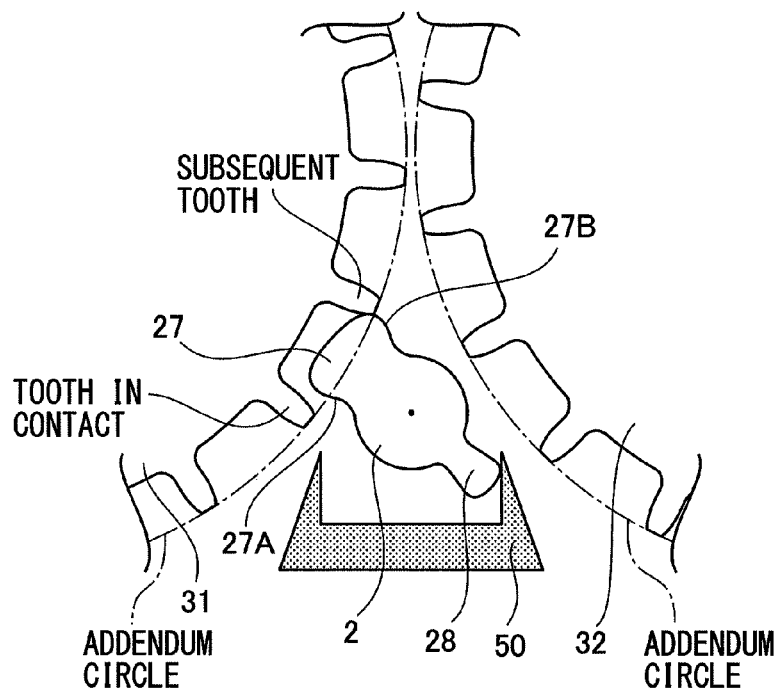
FIG. 26 shows that a subsequent tooth of the star wheel hits the cam to prevent it from excessively rotating.

Moreover, at both ends of the oscillation angle range of the rotor 2, that is, while the convexity 28 is physically hitting the rotation restricting element 50, the cam face (27B contacting the other star wheel in FIG. 25) opposite to the other one (27A rotating the star wheel 31 in FIG. 25) enters the addendum circle of the teeth of the star wheel in the vicinity of a subsequent tooth (in the rotary direction) to the one contacting the cam face. Because of this, an excessively rotating star wheel 31 in FIG. 26 hits the cam face 27B at the subsequent tooth in the addendum circle, therefore, the continuance of the excessive rotation can be prevented.

In addition, the amount (angle) of the excessive rotation of the star wheel to hit the cam face 27B is an extremely small angle from the angular position at which the subsequent tooth should have been stopped originally to that at which it contacts the cam face 27B. The excessive rotation amount can be reduced to a very small value.

Fourth Embodiment

Figure 27:
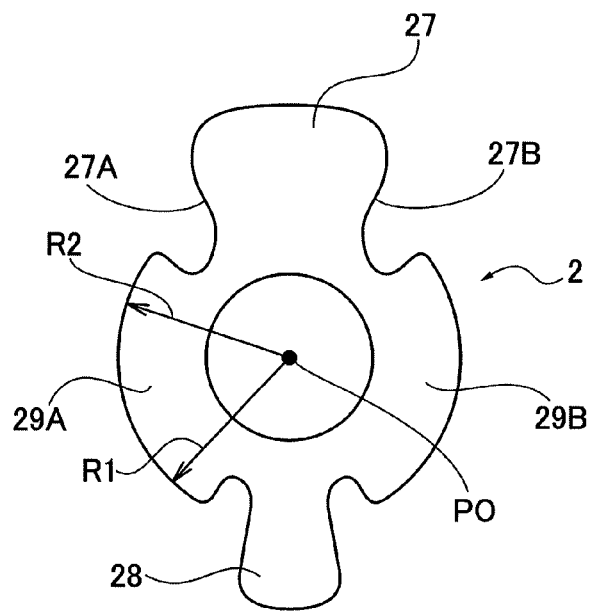
FIG. 27 is a plan view of a rotor having an additional protrusion on the tooth bottom according to a fourth embodiment and equivalent to FIG. 20.

FIG. 27 shows the oscillating stepping motor according to a fourth embodiment of the present invention. The rotor 2 in the third embodiment additionally includes tooth bottom protrusions 29A, 29B in a space around the oscillation center P0 between the cam faces 27A, 27B except for the cam faces 27A, 27B (area excluding an area necessary for the cam faces 27A, 27B to contact and rotate the corresponding star wheels 31, 32). The protrusions are formed to enter the addendum circle of one of the star wheels 31 (or 32) while one of the cam faces 27A, 27B is contacting the other of the star wheels 32 (or 31).

Figure 28:
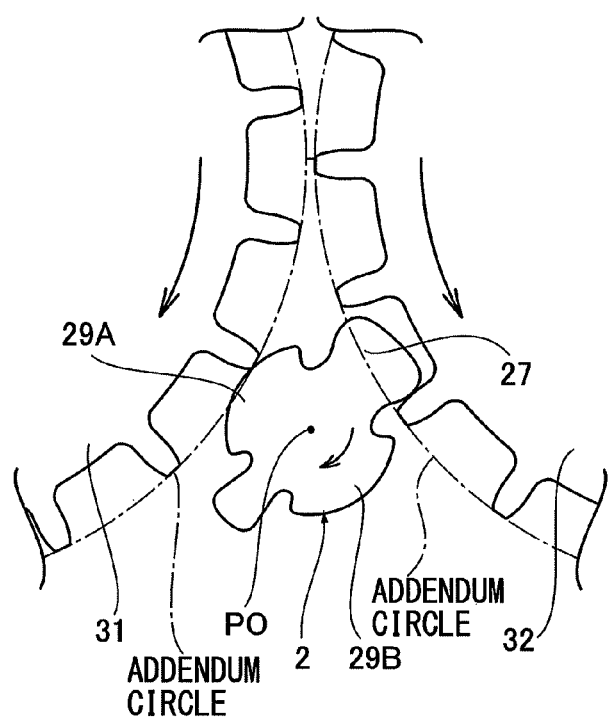
FIG. 28 shows that the rotor rotates one of the star wheels.
Figure 29:
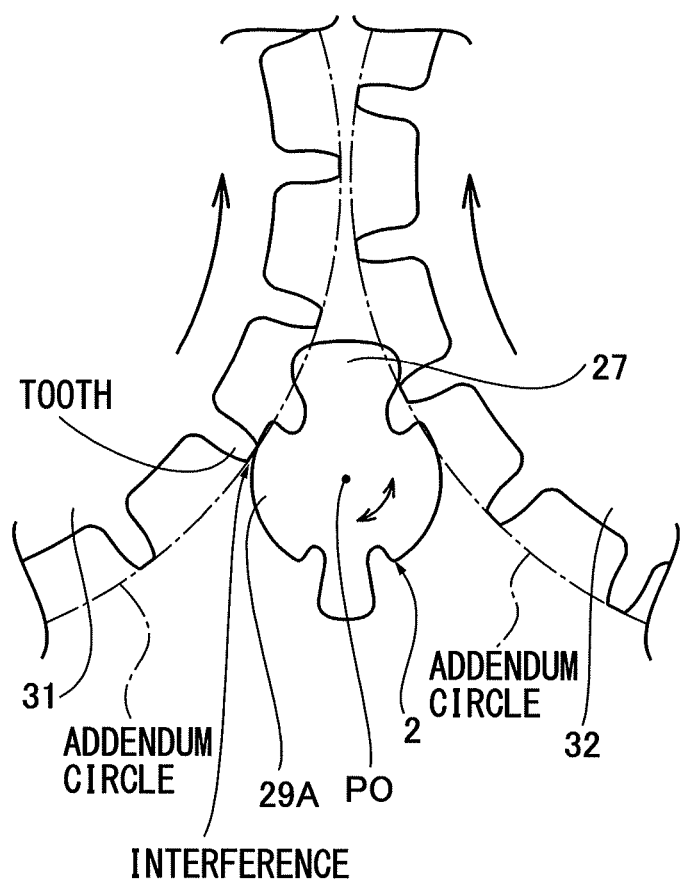
FIG. 29 shows that the other star wheel is prevented from returning by a reversal rotation load.

Specifically, when the rotor 2 is oscillated clockwise in FIG. 28 to feed the cam face 27B to contact the teeth of the star wheel 32 and rotate it counterclockwise, for example, the tooth bottom protrusion 29A of the cam face 27A opposite to the cam face 27B contacting the star wheel 32 enters the addendum circle (indicated by the chain double-dashed line) of the other star wheel 31.

Here, the star wheel 32 receives a reverse rotational load such as a calendar load (to drive it clockwise in the drawing) from the train wheel mechanically connected to the star wheel 32. Because of this, at the time when the teeth of the star wheel 32 are separated from the cam face 27B, the star wheels 32, 31 are going to reversely rotate (star wheel 32, clockwise rotation; star wheel 31, counterclockwise rotation).

The star wheel 31 is rotated forward (counterclockwise for star wheel 32; clockwise for star wheel 31) once and going to be rotated in an opposite direction (counterclockwise in the drawing) by a reverse rotational load. However, according to the oscillating stepping motor in the fourth embodiment, the tooth bottom protrusion 29A has entered in the addendum circle to hit the teeth of the star wheel 31 to stop it. Thereby, it can block the star wheels 31, 32 from rotating in opposite directions.

The height (length R from the oscillation center P0 of the rotor 2 along the radius) of the tooth bottom protrusions 29A, 29B or the angle range a around the oscillation center P0 in which the tooth bottom protrusions 29A, 29B are formed can be arbitrarily set in accordance with the number or height of the teeth of the star wheels 31, 32 or the positional relation between the star wheels 31, 32 and the rotor 2.

Further, the height of the tooth bottom protrusions 29A, 29B can be even or uneven over the entire angle range a, or different only in a specific angle range. The height and angle range thereof can be arbitrarily set or can be also decided in accordance with the number or height of the teeth of the star wheels 31, 32 or the positional relation between the star wheels 31, 32 and the rotor 2.

INDUSTRIAL APPLICABILITY

The present invention can be applied for a drive source of an electric timepiece such as a wrist watch including various hands. In particular it is suitable for a continuous motion type electric analog wrist watch owing to little energy loss in driving.

The invention claimed is:

1. An oscillating stepping motor, comprising:
    an output gear, a rotor and two driving wheels;
    wherein:
    the output gear is rotated by a certain angle in a certain direction by oscillating the rotor in a certain angle range to feed the two driving wheels in sequence;
    the rotor includes two feed teeth;
    one of the two feed teeth feeds one of the two driving wheels by oscillation of the rotor in one direction and the other of the two feed teeth feeds the other of the two driving wheels by the oscillation of the rotor in the other direction;
    the two driving wheels are comprised of two star wheels contacting and being driven by the two feed teeth in a certain direction and two gears coupled with the two star wheels, respectively, so as to be associated with each other;
    the two star wheels are positioned so that tooth tips thereof are not engaged with each other; and
    the two gears are positioned so that tooth tips thereof are engaged with each other.

2. An oscillating stepping motor according to either claim 1, wherein:
    the two feed teeth are provided at a certain aperture angle relative to a rotational shaft of the rotor; and
    the certain aperture angle is an angle at which, in a state in which the rotor is free from drive force and remains at a neutral position only by a retaining force of a stator, one of the two feed teeth closely approaches one tooth of one of the two star wheels in a first distance, and the other of the two feed teeth closely approaches one tooth of the other of the two star wheels in a second distance larger than the first distance.

3. An oscillating stepping motor according to claim 1, wherein
    each of the two feed teeth is configured to be located outside a triangular area formed by a center of the two star wheels and a center of a rotational shaft of the rotor.

4. An oscillating stepping motor according to claim 1, wherein
    when one of the two feed teeth and one tooth of one of the two star wheels ahead approach each other most at a neutral position only by a retaining force of a stator, at a next driving, the one of the two feed teeth drives the one of the two star wheels, and at completion of the driving, when the rotor returns to the neutral position, the other of the two feed teeth and the other of the two star wheels ahead approach each other most, and at another next driving, the other of the two feed teeth drives one tooth of the other of the two star wheels.

5. An oscillating stepping motor according to claim 1, wherein the two gears are coaxially fixed onto the two star wheels, respectively.

6. An oscillating stepping motor according to claim 5, wherein:
    an angular relation of the two star wheels and two gears is set such that a direction in which shafts and teeth of the two star wheels are connected is shifted by a half pitch from a direction in which the shafts of the two star wheels and a rotational shaft of the rotor are connected; and
    the two star wheels are driven alternatively by a half pitch by the oscillation of the rotor.

7. An oscillating stepping motor according to claim 1, further comprising a rotation restricting element to restrict an oscillation angle of the rotor.

8. An oscillating stepping motor in which an output gear is rotated by a certain angle in a certain direction by oscillating a rotor in a certain angle range to feed two driving wheels in sequence, wherein:
    the rotor includes two and only two feed teeth; and
    one of the two feed teeth feeds one of the two driving wheels by oscillation of the rotor in one direction and the other of the two feed teeth feeds the other of the two driving wheels by the oscillation of the rotor in the other direction.

* * * * *